(12) United States Patent
Ito et al.

(10) Patent No.: US 7,215,827 B2
(45) Date of Patent: May 8, 2007

(54) OBJECT DETECTION METHOD USING AN IMAGE-PICKUP DEVICE WITH EASY DETECTION MASKING REGION SETTING AND OBJECT DETECTION APPARATUS USING THE METHOD

(75) Inventors: Wataru Ito, Kodaira (JP); Shinya Ogura, Kodaira (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 776 days.

(21) Appl. No.: 10/387,433

(22) Filed: Mar. 14, 2003

(65) Prior Publication Data

US 2003/0174253 A1 Sep. 18, 2003

(30) Foreign Application Priority Data

| Mar. 15, 2002 | (JP) | ............................ 2002-072100 |
| Mar. 15, 2002 | (JP) | ............................ 2002-072116 |
| Mar. 28, 2002 | (JP) | ............................ 2002-090636 |
| Apr. 19, 2002 | (JP) | ............................ 2002-117395 |

(51) Int. Cl.
*G06K 9/20* (2006.01)
*G06K 9/36* (2006.01)
*G09G 5/00* (2006.01)
*H04N 1/38* (2006.01)

(52) U.S. Cl. ....................... 382/283; 382/282; 345/626; 358/464

(58) Field of Classification Search ................ 382/282, 382/283, 276, 236, 176, 173, 107; 345/620–628; 358/453, 464
See application file for complete search history.

(56) References Cited

U.S. PATENT DOCUMENTS

| 6,876,367 | B2 * | 4/2005 | Wada et al. ................. 345/690 |
| 2004/0062440 | A1 * | 4/2004 | Srinivasa .................... 382/173 |
| 2004/0151342 | A1 * | 8/2004 | Venetianer et al. ......... 382/103 |

FOREIGN PATENT DOCUMENTS

| JP | 62222394 | 9/1987 |
| JP | 03035368 | 2/1991 |
| JP | 7-79429 | 3/1995 |

OTHER PUBLICATIONS

A. Rosenfeld, et al., "Digital Picture Processing", Academic Press, 1976, pp. 362-367.

* cited by examiner

*Primary Examiner*—Yon J. Couso
(74) *Attorney, Agent, or Firm*—Mattingly, Stanger, Malur & Brundidge, P.C.

(57) ABSTRACT

In object detection method and apparatus, a detection image related to a binary image obtained by subtracting a background image from an input image delivered from an image-pickup device is displayed on the display screen of a display unit, responsive to an operation done by an operator who determines that at least one object in the displayed detection image is a region to be excluded from object detection, the region of the object is set as a masking region automatically and thereafter, object detection is performed in respect of individual input images while performing masking in the masking region.

35 Claims, 31 Drawing Sheets

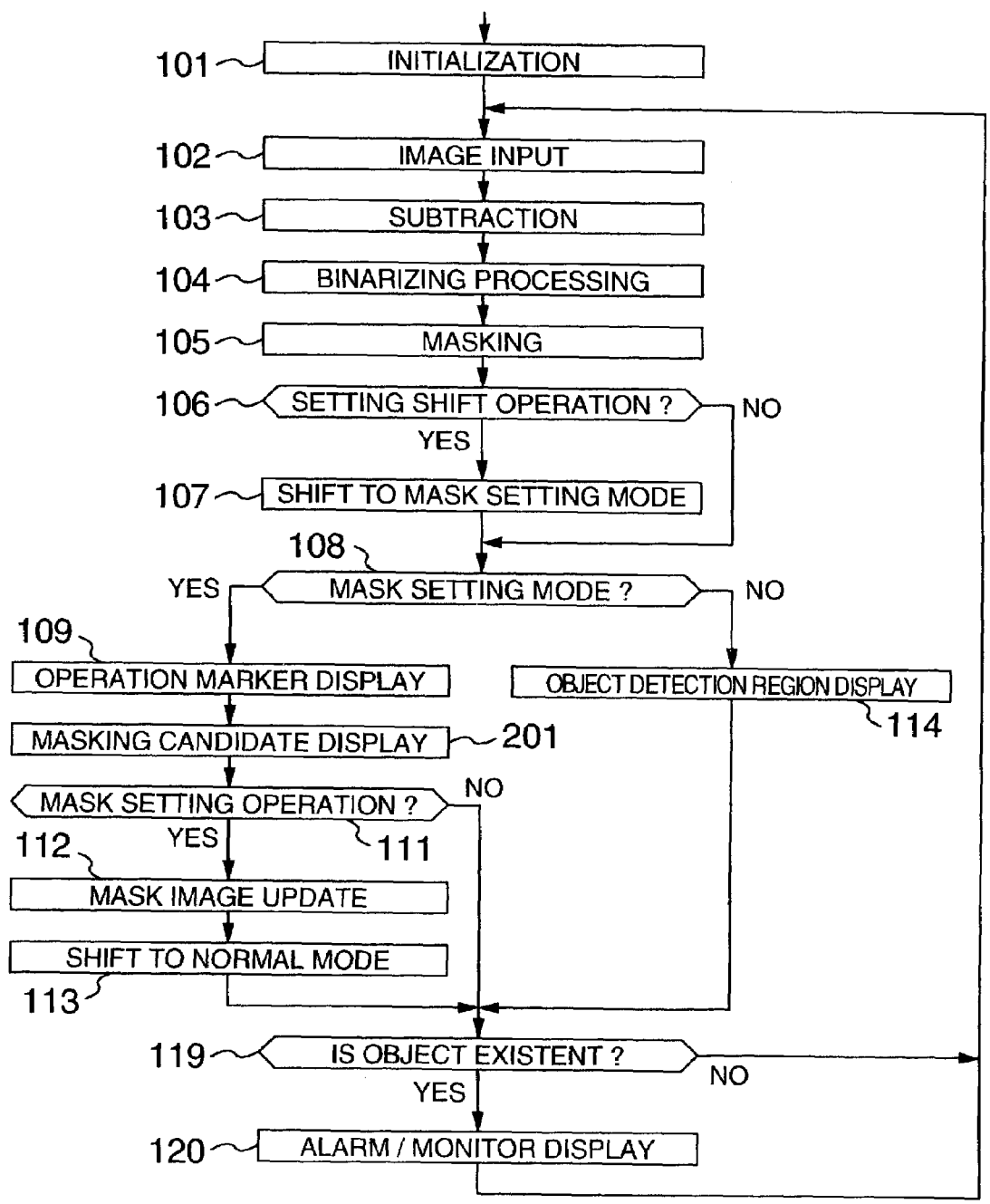

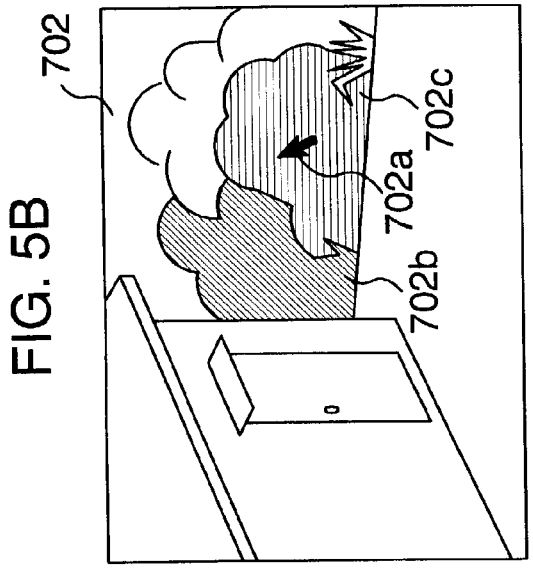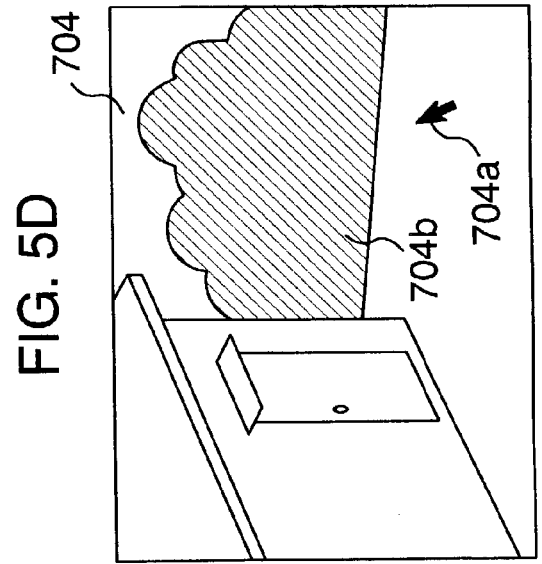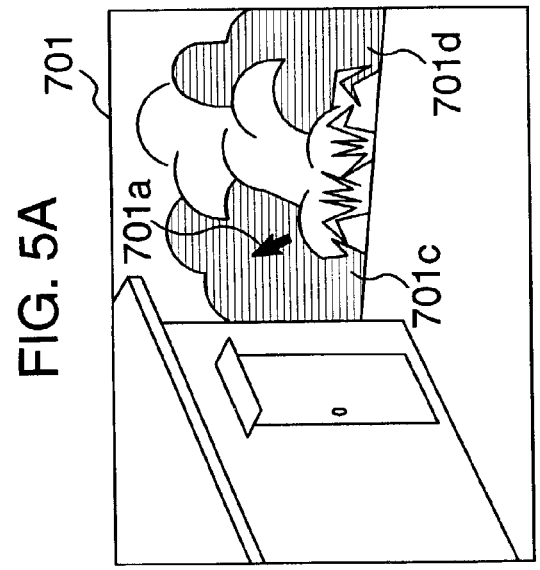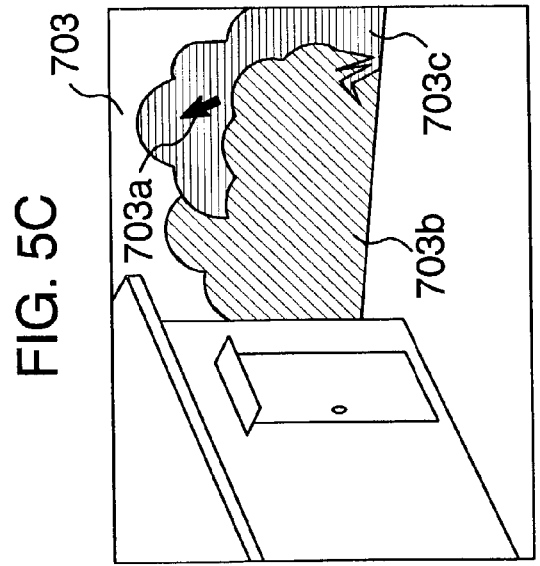

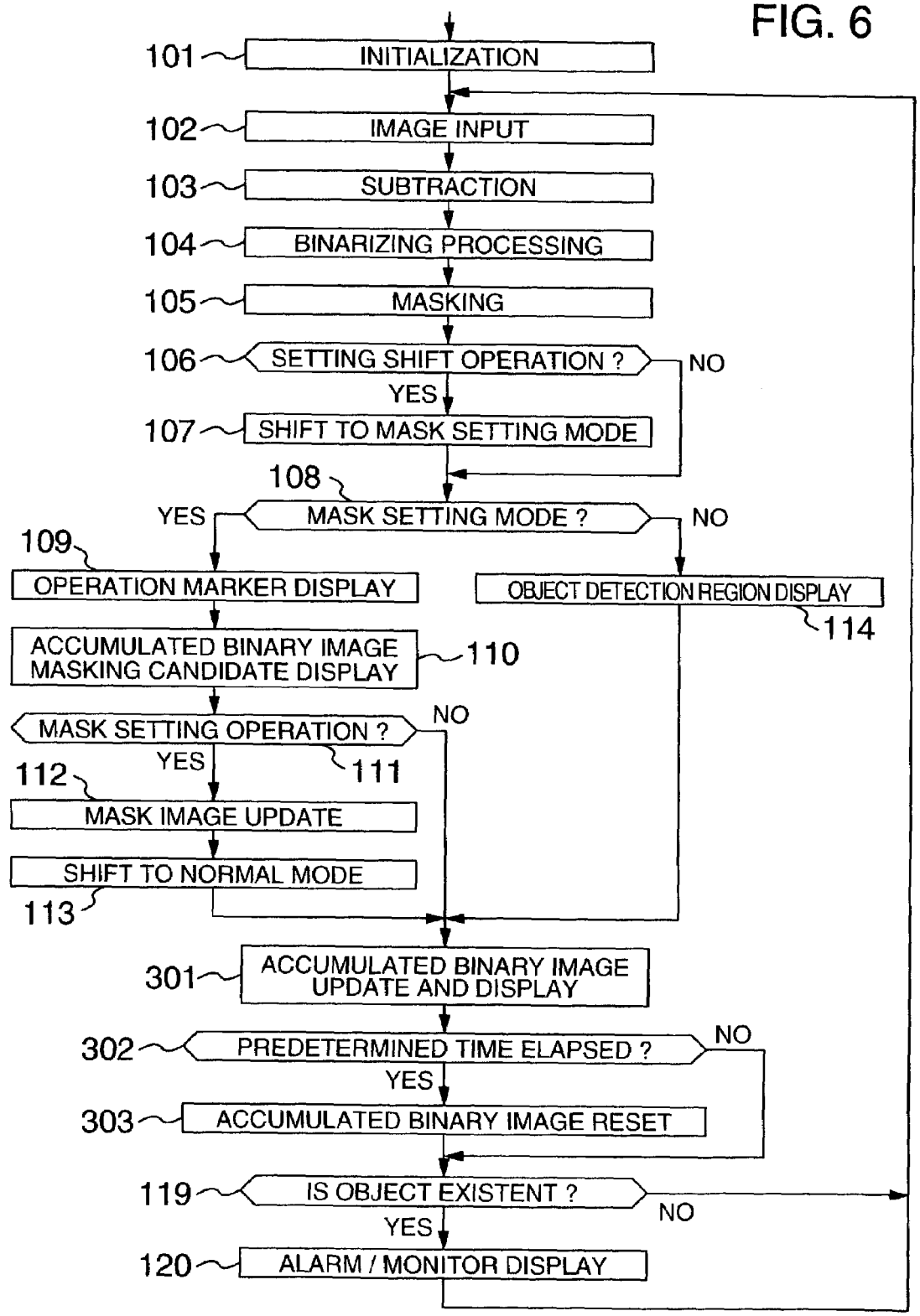

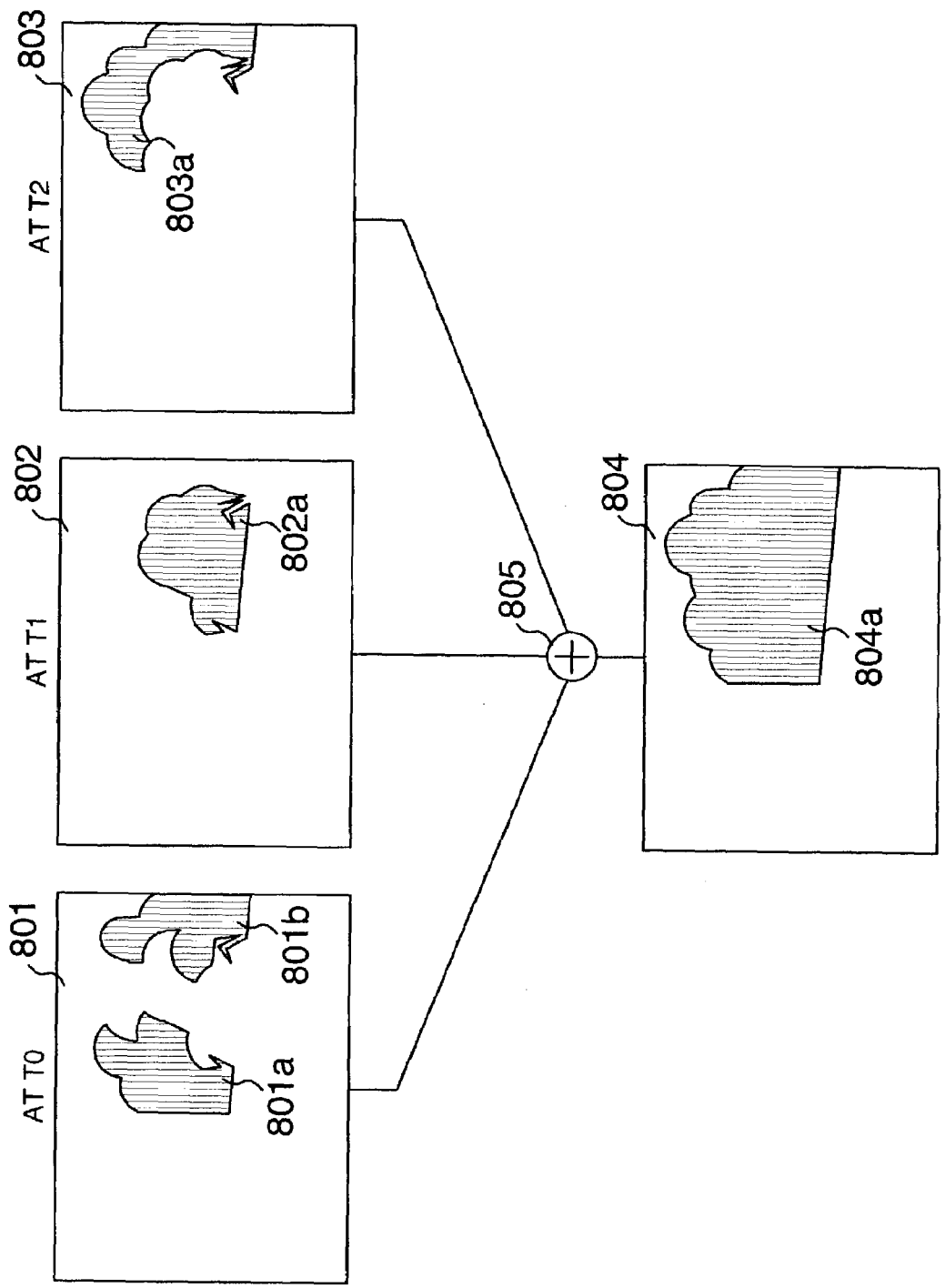

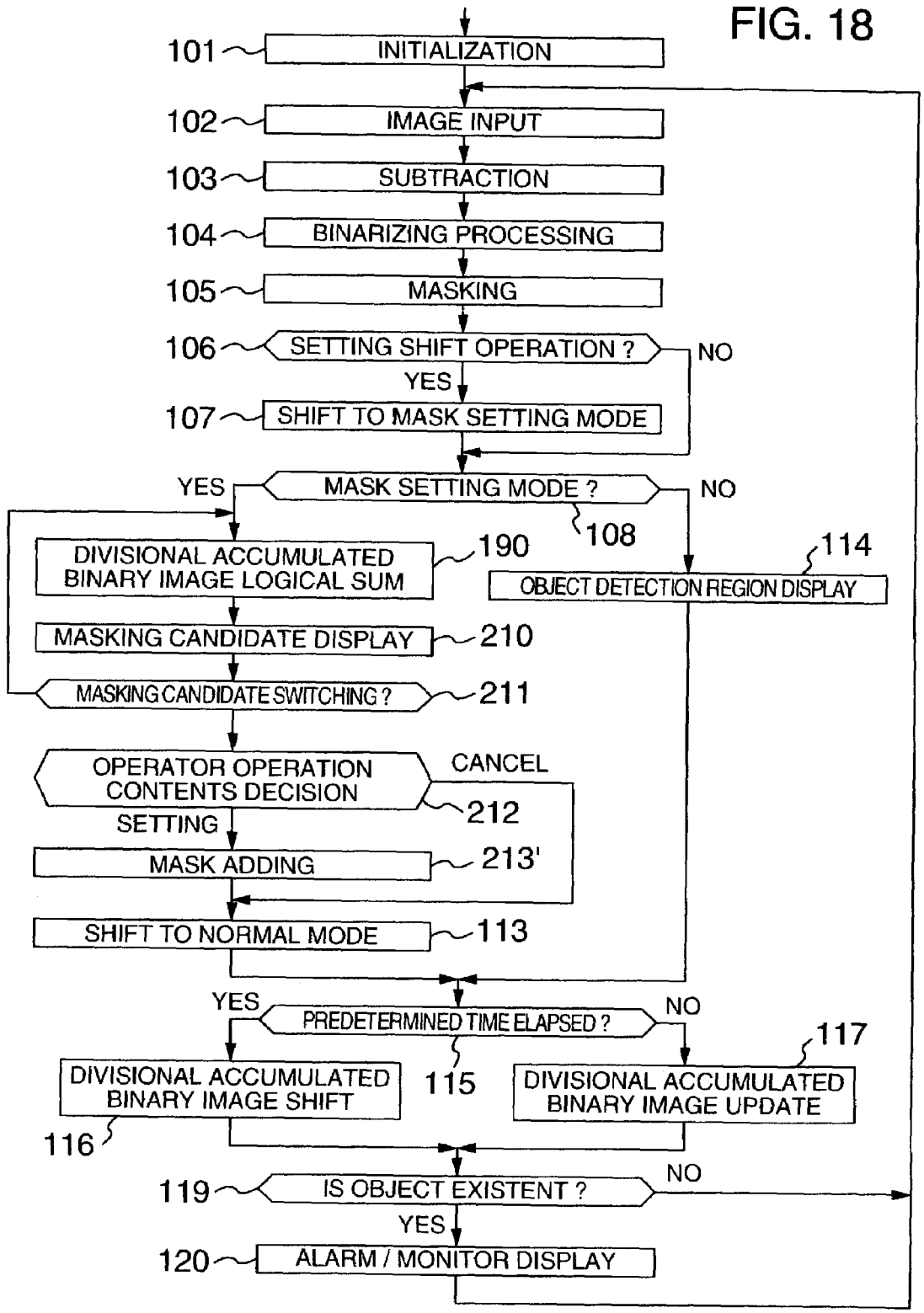

OBJECT DETECTION METHOD USING AN IMAGE-PICKUP DEVICE WITH EASY DETECTION MASKING REGION SETTING AND OBJECT DETECTION APPARATUS USING THE METHOD

BACKGROUND OF THE INVENTION

The present invention relates to an object detection method using an image-pickup device and an object detection apparatus using the method and more particularly, to object detection method and apparatus which, when automatically detecting from a video signal inputted to the image-pickup device objects, such as an object intruding into the range of image-pickup view field, can easily set a masking for a region that differs from a background image within the image-pickup view field range but is not to be detected as an intruding object.

An image monitoring (surveillance) unit using an image-pickup device such as television camera (hereinafter termed as a TV camera) has hitherto been used widely. A monitoring system using such an image monitoring unit as above has however been required to be such a system that an intruding object such as person or automobile being intruding into the monitoring view field of the image-pickup device is not detected manually by an operator who watches an image displayed on a monitor but is automatically detected from an image inputted to an image input means such as a camera.

In order to realize the system as above, a difference between a reference image, such as a reference background image, a previous input image picked up a predetermined earlier or the like and an input image is first detected through, for example, a well-known subtraction method to detect an intruding object in the view field. The subtraction method is a method in which an input image obtained from a TV camera is compared with a reference background image prepared in advance, that is, an image lacking any pictures of an object to be detected so as to obtain a difference or subtracted value in brightness value between the two images for each pixel and a region in which the difference values or the subtracted values are large is detected as the object. Processing of the subtraction method is described in JP-A-7-79429, for instance.

SUMMARY OF THE INVENTION

Referring now to FIG. 1 and FIGS. 2A and 2B, an example of the subtraction method will be described.

FIG. 1 is a diagram useful to explain the flow of a process for detecting an object intruding into a view field of an image-pickup device pursuant to the subtraction method. In FIG. 1, reference numerals S01 designates an input image, S02 a reference background image, S03 a subtracted image between the input and reference background images, S04 a binary image of the subtracted image, S05 a subtraction processing unit, S06 a binarizing processing unit, S07 an object of human figure picked up in the input image S01, S08 a subtracted image corresponding to human figure object S07 in the subtracted image S03 and S09 an object of the human figure in binary image S04 (a binary image of the human figure) corresponding to the subtracted image S08 of human figure.

In FIG. 1, an input image S01 of, for example, 320×240 pixels is first inputted from the camera. Subsequently, in the subtraction processing unit S05, subtraction between pixels values of individual pixels of the input image S01 and pixel values of individual pixels of the reference background image S02 prepared in advance is calculated to obtain a subtracted image S03. As a result, an object S07 of human figure in the input image S01 appears as a subtracted image S08 of human figure in the subtracted image S03. Then, in the binarizing processing unit S06, ones of individual pixels in subtracted image S03 which have subtracted values less than ay predetermined threshold value (for example, less than 20) are so processed as to have their pixel values replaced with "0" and others in subtracted image S03 which have subtracted values not less than the predetermined threshold value are so processed as to have their pixel values replaced with "255" (in the present specification, an example handling one pixel of 8 bits will be described), thereby obtaining a binary image S04. In this phase, the object S07 of human figure picked up in the input image S01 is detected as an object S09 of human figure in the binary image S04. In this case, when the object S09 has a larger area than a predetermined one, the presence of an intruder, for instance, can be determined.

FIGS. 2A and 2B are diagrams for explaining problems raised when the aforementioned subtraction method is used. In FIG. 2A, an intruding object 601a is displayed in an input image 601, along with a reference background image including part of a building provided with a door and shrubberies. When the subtraction method is applied to such a scene, a region of intruding object 601a is of course detected and in addition, there is a possibility that trees and grass existing or growing in the shrubbery portion of the reference background image will be detected erroneously as an intruder because they are caused to rustle in the wind, for instance. In other words, when being caused to rustle in the wind, for instance, regions of trees and grass, for example, partial regions 601b and 601c become different from the reference background image and they are detected as intruders. Consequently, it is determined that three intruding objects exist.

To cope with such a problem as above, a masking process as shown in FIG. 2B has hitherto been used widely. In FIG. 2B, an input image 602 shows a state that a masking region is set to a region 602b where trees and grass grow. The inside of the masking region 602b is processed as a blind zone in which even with an intruding object detected, no detection output is delivered. In other words, even when an intruding object is detected in the region to which the masking process is applied, such a detection is prevented from being outputted so that the presence of only an intruding object 602a may be determined in the input image 602.

A further explanation of the intruding object detection using the masking process will be given below with reference to a flowchart.

FIG. 29 is a flowchart showing a prior art processing for intruding object detection. Explanation will be made with reference to FIG. 1 as well.

First, in initialization step 101, an image memory for image recording held in an image memory for object detection processing and variables held in a work memory are initialized.

In the image input step 102, an input image S01 of, for example, a width of 320 pixels and a height of 240 pixels, where 8 bits per pixel, is acquired from the camera. In the subtraction step 103, subtraction between individual pixels of the input image S01 obtained in the image input step 102 and individual pixels of a reference background image S02 precedently recorded on image memory is calculated to acquire a subtracted image S03. Next, in the binarizing processing step 104, the individual pixels of the subtracted image S03 obtained in the subtraction step 103 are applied with a process based on a threshold value, so that a pixel value less than the threshold value (for example, 20) is converted to the pixel value "0" and a pixel value not less than the threshold value is converted to the pixel value "255" to thereby provide a binary image S04. When the subtracted image obtained in the subtraction step 103 is binarized in the binarizing step 104 in this way, trees and grass detected in the region 602b rustling in the wind may be detected as intruding objects, as explained earlier with reference to FIG. 2B. To prevent this, in the next masking process step 105, the masking process is applied to the region 602b so that the trees and grass rustling in the wind may not be detected as intruding objects. In this way, by masking the region 602b, only the intruding object 602a can be detected without erroneously detecting the trees, grass and so on in the region 602b as intruding objects.

Next, in setting shift operation decision step 106, when the operator operates the operation input unit to shift the processing mode to a mask setting mode, the program branches to shift to mask setting mode shift step 107, while when the processing mode does not shift to the mask setting mode, the program branches to mask mode decision step 108 without changing the processing mode which is managed by a process mode variable in the work memory. In the shift step 107, shifting to the mask setting mode is carried out by, for example, depressing a first button of operation input unit and the processing mode is set to the mask setting mode. Subsequently, in the mask setting mode decision step 108, when the processing mode is not the mask setting mode, the program branches to object detection region display step 114.

In the operation marker display step 109, an operation marker is displayed on an output monitor through the image output I/F or interface.

Next, in a masking region setting step 200, the operator sets, as a masking region, a region which the operator wishes to set as the masking region (for example, the region 602b in FIG. 2B) among the displayed image, by moving the operation marker and by encircling or contouring the desired region with a polygon. Then, the program goes to normal mode shift step 113. In the normal mode shift step 113, the processing mode is set to a normal mode. By setting to the normal mode, the program goes to object existence decision step 119 to determine whether an object is detected or not based on the processes of the steps 102 to 105. The normal mode is a mode in which setting, changing, updating and so on of the detecting conditions such as setting, updating and the like of the masking region by the operator is not being carried out but detection of an intruding object from an input image is being carried out.

Then, in the object existence decision step 119, such a cluster of "255" values as designated by S09 is detected through, for example, well-known labeling method from the masked binary image obtained through the binarizing processing step 104 and masking step 105 to decide whether an object exists. If existent, the program branches to alarm/monitor display step 120 but if nonexistent, the program returns to the image input step 102. For example, in the alarm/monitor display step 120, an image of the target object is displayed on the output monitor or an alarm lamp is turned on to thereby give notice that an intruding object exists. When the processing ends, the process flow returns to the image input step 102 and the same process flow is again repeated.

By setting the masking region in this manner, erroneous detection of an intruding object can be prevented but meanwhile, setting of the masking region restricts the monitoring view field and therefore, it is important to properly set as narrow a masking region as possible.

In the conventional masking region setting method, a polygonal region for contouring a masking region inside monitoring view field where, for example, trees and grass grow is designated and such a region as the masking region 602a in FIG. 2B must precedently be recorded in an object detection apparatus. This masking region setting operation, however, requires skillfulness and besides, in case a masking region is contoured using a polygonal form, accurate designation of the masking region is very difficult to achieve. Furthermore, when trees and grass grow isolatively, there also arises a problem that a mask must be designated to each cluster of trees and grass.

Such a mask setting operation as above is required to be carried out more simply and properly and besides, during a time period (time zone or season) in which trees and grass growing in the shrubbery portion of the reference background image rustle negligibly slightly in the wind, sufficient monitoring can be assured by rather releasing the shrubbery portion from the masking region and hence the masking region once set is required to be released timely.

An object of the present invention is to provide highly easy-to-operate object detection method and apparatus which can permit an operator to set a masking region with ease.

Another object of the invention is to provide highly easy-to-operate object detection method and apparatus which can permit an operator to easily set a masking region and to release the once set masking region easily and timely as necessary.

According to one aspect of the invention, an object detection method for detecting a moving object comprises the steps of:
  detecting level changes between an input image from an image-pickup apparatus and a background image recorded in a recording apparatus;
  displaying an image including at least the detected level changes on a display apparatus;
  designating, within the image including the level changes, an area of a predetermined level change as a masking region;
  registering, as a masking image, an image obtained by designating the masking region in the recording apparatus; and
  comparing an input image inputted from the image pickup-apparatus with the masking image to detect the moving object.

According to another aspect of the invention, an object detection apparatus comprises:
  an image-pickup apparatus for picking-up an image of the moving object;
  a recording apparatus for recording a background image;
  a level change detecting unit for detecting level changes between an input image from the image-pickup apparatus and the background image recorded in the recording apparatus;
  a display apparatus for displaying an image including at least the level changes detected by the level change detecting unit;
  a masking region designating unit for designating a region of a predetermined level change as a masking region within the image including the level changes;
  a processing unit for registering the image obtained by designating the masking region in the recording apparatus and comparing the registered masking region with the input image inputted from the image-pickup apparatus to detect the moving object; and a control unit for controlling the image-pickup apparatus, the recording apparatus, the level change detecting unit and the processing unit.

Other objects, features and advantages of the invention will become apparent from the following description of the embodiments of the invention taken in conjunction with the accompanying drawings.

BRIEF DESCRIPTION OF THE DRAWINGS

FIG. 4 is a flowchart showing a processing process according to the embodiment 1 of the invention.

FIGS. 5A to 5D are diagrams for explaining details of a procedure of setting a masking region explained in connection with FIG. 4.

FIG. 6 is a flowchart showing a processing process according to embodiment 2 of the invention.

FIG. 7 is a diagram for explaining effects of the embodiment 2.

FIGS. 12A to 12C are diagrams for explaining another example of releasing the masking region executed on the basis of divided blocks in the embodiment 4.

FIG. 18 is a flowchart showing a processing process according to embodiment 9 of the invention.

DESCRIPTION OF THE EMBODIMENTS

Figure 1:
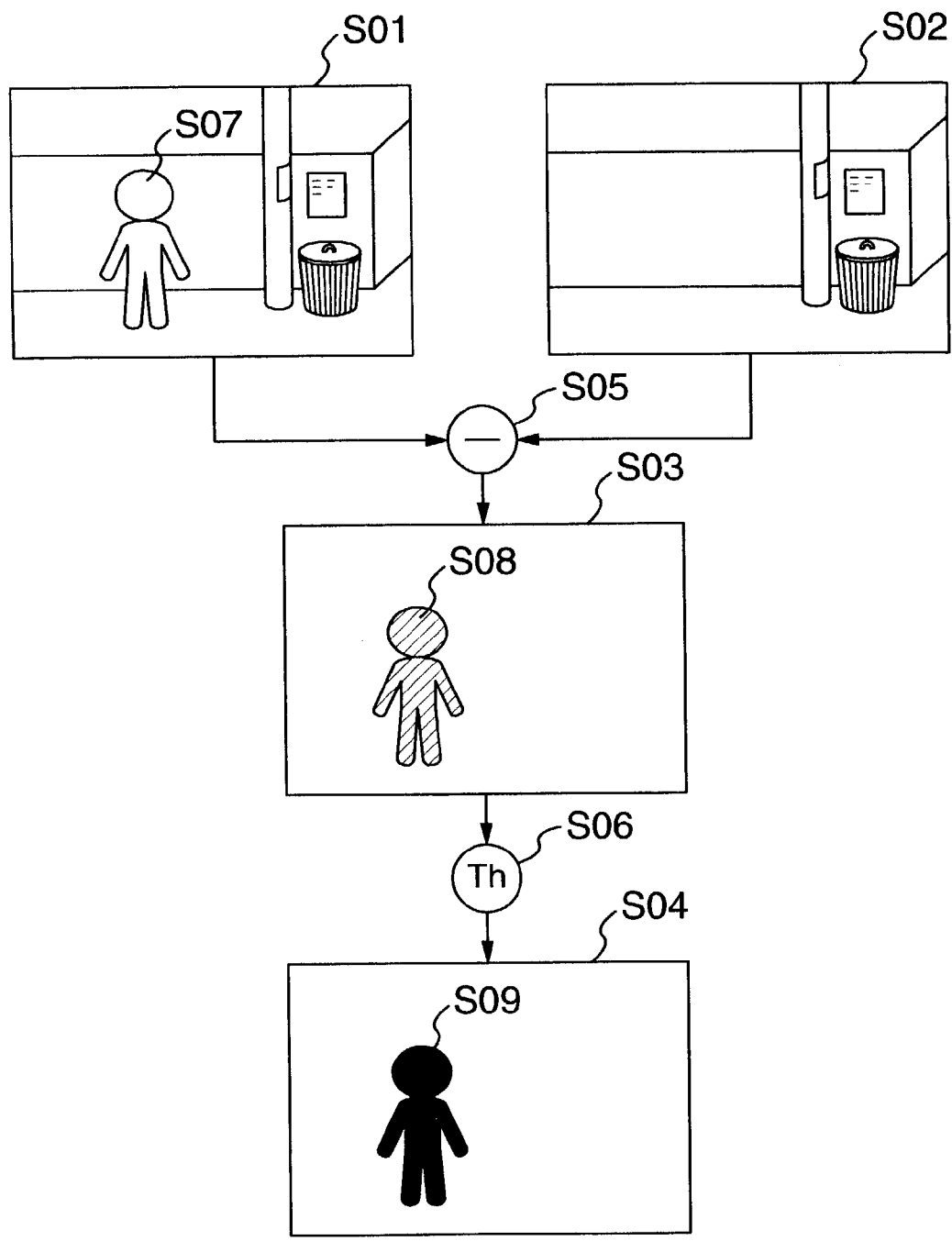
FIG. 1 is a diagram for explaining the flow in a process for detecting an object intruding into a view field of an image-pickup device pursuant to a subtraction method.

The present invention will now be described by way of example with reference to the accompanying drawings. Throughout the drawings, like members are designated by like reference numerals.

Figure 3:
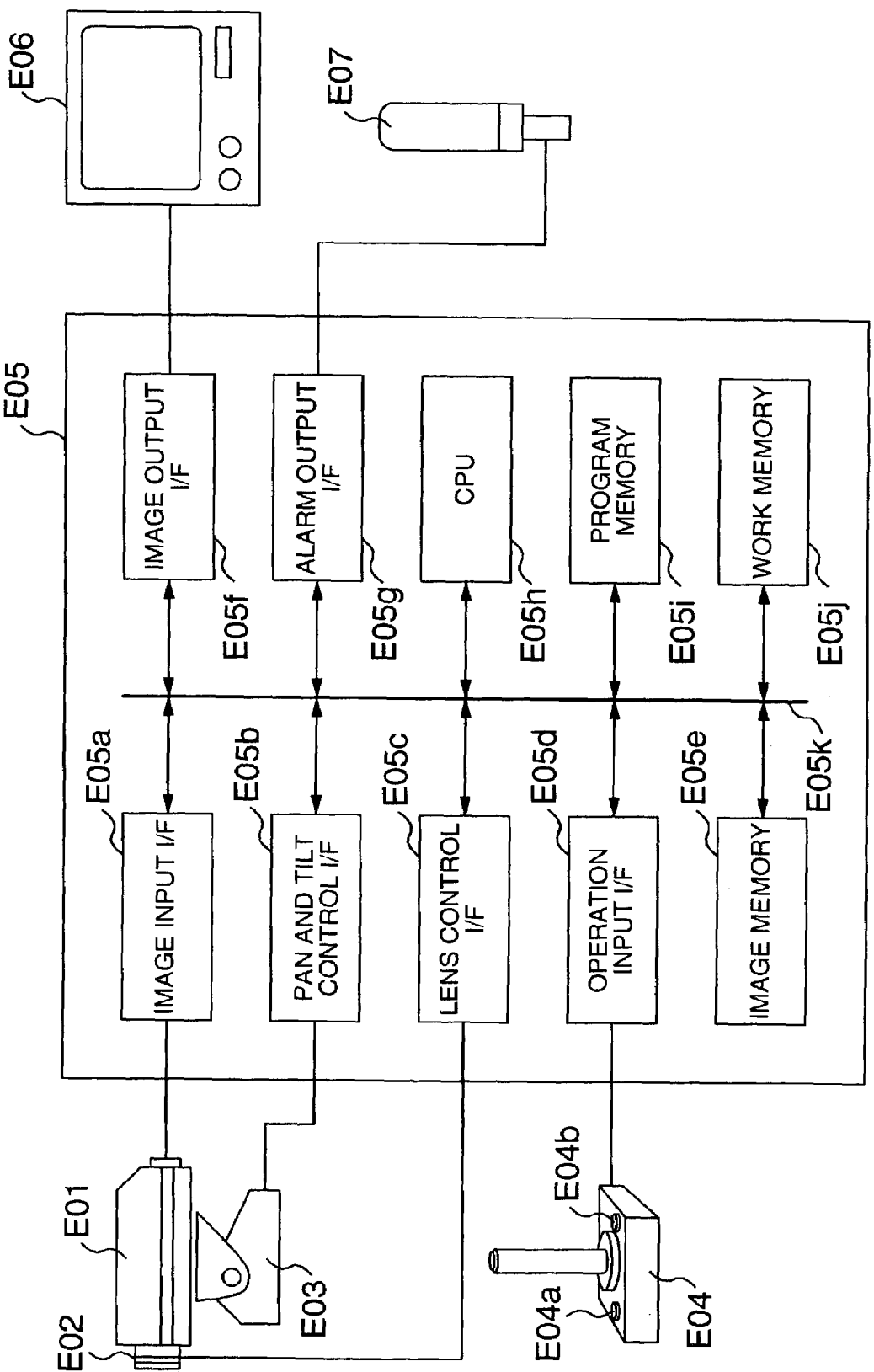
FIG. 3 is a block diagram showing the hardware construction of an object detection apparatus according to embodiment 1 of the invention.

Referring first to FIGS. 3 and 4, there is illustrated, in block diagram form, the hardware construction of an object detection apparatus according to embodiment 1 of the invention.

FIG. 3 shows a hardware structure of the object detection apparatus of embodiment 1. Note that the hardware structure of FIG. 3 will be used for explanation of other embodiments as well.

In FIG. 3, reference numeral E01 designates an image-pickup device (hereinafter termed a TV camera), E02 a zoom lens, E03 a motor-driven turning base (hereinafter termed a camera pan and tilt head), E04 an operation unit or operation input unit, E04a a first button attached to the operation unit E04, E04b a second button attached to the operation unit E04, E05 an intruding object monitoring unit, E05a an image input I/F (I/F: interface), E05b a pan and tilt head control I/F, E05c a lens control I/F, E05d an operation input I/F, E05e an image memory, E05f an image output I/F, E05g an alarm output I/F, E05h a CPU (central processing unit), E05i a program memory, E05j a work memory, E05k a data bus, E06 an output monitor and E07 an alarm lamp. The camera E01 is connected to the image input I/F E05a, the zoom lens E02 to the lens control I/F E05c, the camera pan and tilt head E03 to the pan and tilt head control I/F E05b, the operation unit E04 to the operation input I/F E05d, the output monitor E06 to the image output I/F E05f and the alarm lamp E07 to the alarm output I/F E05g. Further, the image input I/F E05a, pan and tilt head control I/F E05b, lens control I/F E05c, input I/F E05d, image memory E05e, image output I/F E05f, alarm output I/F E05g, CPU E05h, program memory E05i and work memory E05j are coupled to the data bus E05k so as to be able to perform mutual transmission/reception of signals.

In FIG. 3, the TV camera E01 mounted on the camera pan and tilt head E03 and provided with the zoom lens E02 picks up a object to be monitored (view field range). A picked up video signal is delivered to the image input I/F E05a and then accumulated or stored in the image memory E05e through the data bus E05k. The CPU E05h complies with a program stored in the program memory E05i to analyze, inside the work memory E05j, the image accumulated or stored in the image memory E05e. In accordance with a result of processing, the CPU E05h controls, by way of the data bus E05k, the zoom lens E02 via the lens control I/F E05c and the camera pan and tilt head E03 via the pan and tilt head control I/F E05b to change the image-pickup view field of the TV camera E01, turns on the alarm lamp E07 via the alarm output I/F E05g or displays an intruding object detection result image, for instance, on the monitor E06 via the image output I/F E05f. It is to be noted that the image memory E05e is also provided with a template image memory for storing registered reference background images.

FIG. 4 is a flowchart showing a processing process according to embodiment 1.

Firstly, in initialization step 101, an image memory for image recording held in the image memory E05e so as to be used in object detection processing and variables held in the work memory E05j are initialized and the processing mode (managed by processing mode variables in the work memory E05j) is set to a normal mode. In the image input step 102, an input image S01 of, for example, a width of 320 pixels and a height of 240 pixels, where 8 bits per pixel, is acquired from the camera E01. In the subtraction step 103, subtraction between individual pixels of the input image S01 obtained in the image input step 102 and individual pixels of a reference background image S02 precedently recorded on image memory E05e is calculated to acquire a subtracted image S03. Next, in the binarizing processing step 104, the individual pixels of the subtracted image S03 obtained in the subtraction step 103 are applied with a process based on a threshold value, so that a pixel value less than the threshold value (for example, 20) is converted to the pixel value "0" and a pixel value not less than the threshold value is converted to the pixel value "255" to thereby provide a binary image S04. By binarizing the subtracted image obtained in the subtraction step 103 in the binarizing step 104 in this way, trees and grass rustling in the wind detected within the region 602b are also detected as intruding objects, besides the intruding object 602a. Considering such, the region 602b is subjected to masking processing in next masking step 105 so that the trees and grass rustling in the wind may not be erroneously detected as intruding objects. In this way, by masking the region 602b, only the intruding object 602a is detected and no erroneous detection of trees, grass or the like in the region 602a as intruding objects is avoided.

Next, in setting shift operation decision step 106, when the operator operates the operation input unit E04 to shift the processing mode to a mask setting mode, the program branches to shift to mask setting mode step 107 but when the processing mode does not shift to the mask setting mode, the program branches to mask mode decision step 108. Shifting to the mask setting mode is carried out by, for example, depressing the first button E04a of operation input unit E04. In the shift to mask setting mode step 107, the processing mode is set to the mask setting mode. Subsequently, in the mask mode decision step 108, when the processing mode managed by a processing mode variable inside the work memory E05j indicates the masking mode, the program branches to operation marker display step 109 but when the masking mode is not indicated, the program branches to object detection region display step 114.

In the operation marker display step 109, an operation marker is displayed on the output monitor E06 through the image output I/F E05f. The operation marker may take the form of an arrow 701a or 702a shown in FIG. 5A or 5B, for instance, but may take any indication form such as a crucial, spot or rectangular form which can identify the position of the operation marker. Like the cursor in personal computers, the displayed operation marker can be moved to a desired position on the display screen by means of, for example, a not-shown mouse connected to the operation input I/F E05d. Next, in masking candidate region display step 201, a binary image in which a region corresponding to the masked region determined in the masking step 105 is masked is displayed on the output monitor E06 through the image output I/F E05f. In other words, of objects to be detected as a binary image S04 in FIG. 1, those not confined in the masked region are all displayed.

Thereafter, in mask setting operation decision step 111, the operator designates whether a partial display region in the image displayed as the binary image S04 is set as a mask. More particularly, when determining that a partial region in the displayed image, for example, a region 701c in FIG. 5A to be set as a masking region, the operator moves the operation marker 701a to that region and depresses the second button E04b of operation input unit E04 to perform a mask setting operation. In this case, the program branches to mask image update step 112. But if any mask setting operation is not done, the program branches to object existence decision step 119. In the succeeding mask image update step 112, the masking region is updated in correspondence with the fact that the displayed partial image designated by the operation marker through the depression of second button E04b of the operation input unit E04 in the mask setting operation decision step 111 is added as a masking region. More specifically, the logical sum of individual pixels of the masking region at present stored in the image memory E05e and individual pixels of a binary image of the newly added masking region is calculated to provide a new masking region and the new masking region substitutes for the masking region which has been stored in the image memory E05e. Next, in shift to normal mode step 113, the processing mode is set to the normal mode.

Meanwhile, in the object detection region display step 114, a binary image removed of the image corresponding to the masked region determined in the masking step 105 is displayed on the output monitor E06 through the image output I/F E05f.

Thereafter, in the object existence decision step 119, such a cluster of "255" values as designated by S09 is detected through, for example, well-known labeling method from the masked binary image obtained through the binarizing processing step 104 and masking step 105 to decide whether an object exists. If existent, the program branches to alarm/monitor display step 120 but if nonexistent, the program returns to the image input step 102. For example, in the alarm/monitor display step 120, an image of the target object is displayed on the output monitor E06 or the alarm lamp E07 is turned on to thereby give notice that an intruding object exists. When the processing ends, the process flow returns to the image input step 102 and the same process flow is again repeated.

The procedure of setting a masking region explained in connection with the steps 109, 201, 111, 112 and 113 in FIG. 4 will now be described in greater detail by using an example shown in FIGS. 5A to 5D.

FIGS. 5A to 5C are diagrams for explaining an example of how the operation marker, detection object display and masking region change at time points T0, T1 and T2. In the figures, images 701, 702 and 703 represent images displayed on the output monitor E06 at time points T0, T1 and T2, respectively. Arrows 701a, 702a and 703a represent operation markers, respectively, displayed on the output monitor E06. In order for the operator to set image regions including displayed detection objects represented by images 701c, 702c and 703c as masking regions, respectively, at time points T0, T1 and T2, the operation marker is moved to these image regions as indicated in the drawings. In FIG. 5A, two images 701c and 701d representing detection objects are displayed but in the present embodiment, only one image can be designated as a masking region through one operation and therefore, in this example, the operation marker 701a is so displayed as to be superimposed on the image 701c representing a detection object. In each of the FIGS. 5A to 5C, by positioning the operation marker on an image desired to be designated as a masking region and then depressing the second button E04b of operation input unit E04, a region corresponding to that image can be added as a masking region. More particularly, the masking region 701c set in FIG. 5A is added with the masking region 702c set in FIG. 5B and then added with the masking region 703c set in FIG. 5C. As a result, through three mask mode setting operations at time points T0, T1 and T2, a masking region 704b in the image 704 shown in FIG. 5D is set. In the present embodiment, one image is added to the masking region through one operation but for example, when the second button E04b is depressed twice to designate two positions, a plurality of images existing in a rectangular region having vertexes at the designated positions can be added to the masking region at a time. It is to be noted that an operation marker 704a in FIG. 5D is merely displayed and is not used for setting.

Clearly, the masking region 704b in FIG. 5D accurately includes a region where trees and grass grow. As will be seen from the above, in the present embodiment, the detection image per se is merely decided as to whether to be set as a masking region, with the result that the problem that skillfulness is needed for setting the masking region can be eliminated and besides the problem that when the masking region is set in the form of a polygon, accurate designation of the region where trees and grass grow becomes very difficult can be solved.

FIG. 6 is a flowchart showing a processing process according to embodiment 2.

The present embodiment 2 is to solve a problem encountered in the embodiment 1 that only a region detected accidentally during the processing flow is set as a masking region to make it difficult to set a region detected on and off as a masking region. More particularly, in the case of a detection image detected on and off, an image inputted in the image input step 102 has already been changed to disappear immediately when the processing flow makes a round and advances to the following processing flow, thus raising a problem that movement of the operation marker and operation of the operation unit E04 miss the operation timing. A comparison of FIG. 6 with FIG. 4 will show that in the present embodiment 2, the masking candidate display step 201 in embodiment 1 is replaced with accumulated binary image masking candidate display step 110 and accumulated binary image update step 301, predetermined time lapse decision step 302 and accumulated binary image reset step 303 are added. Steps other than the above are similar to those in embodiment 2 explained with reference to FIG. 4 and will not be described herein.

In the accumulated binary image masking candidate display step 110, an accumulated binary image prepared in the accumulated binary image update step 301 (to be described later) is displayed as a masking candidate region on the output monitor E06 through the image output I/F E05f. In the accumulated binary image update step 301, the logical sum of individual pixels of a masked binary image obtained through the binarizing processing step 104 and masking step 105 and individual pixels of an accumulated binary image stored in the image memory E05e is calculated and a resulting logical-sum binary image substitutes for the accumulated binary image stored in the image memory E05e. In this manner, a detection object region detected on and off is accumulated and recorded and it is displayed as an accumulated binary image masking candidate on the output monitor E06. Subsequently, in the predetermined time lapse decision step 302, the program branches to the accumulated binary image reset step 303 when a predetermined time (for example, 30 minutes) has passed but if the predetermined time has not elapsed, the program branches to the object existence decision step 119. Here, the predetermined time lapse implies expiration of the predetermined time starting with accumulation of a masked binary image in the case of the accumulated binary image update step 301, expiration of the predetermined time starting with final clearing (resetting) of the accumulated binary image in the case of the accumulated binary image reset step 303 or "at intervals of the predetermined period". In the accumulated binary image reset step 303, the accumulated binary image stored in the image memory E05e is reset. In other word, the accumulated binary image can automatically be reset periodically.

Effects of embodiment 2 will be described with reference to FIG. 7. In FIG. 7, reference numerals 801, 802 and 803 designate detection image regions corresponding to the images 701, 702 and 703 at time points T0, T1 and T2 explained in connection with FIGS. 5A to 5C and reference numeral 804 designates a detection image region corresponding to the total region image 704 explained in connection with FIG. 5D. As will be seen from a description given with reference to FIGS. 5A to 5C, by totalizing detection object regions 801a, 801b, 802a and 803a automatically by using a logical sum means 805, an accumulated binary image 804a can be obtained. Therefore, even in the case of partial regions appearing on and off, when they are recorded as accumulated binary images and then subjected to logical sum in this manner, the accumulated binary image 804a corresponding to the masking region 704b representing the total region as shown in FIG. 5D in embodiment 1 can be obtained. Advantageously, this process can be implemented by automatically performing the process for taking logical sum of accumulated binary images without resort to the mask setting operation carried out through three operation marker operations in embodiment 1.

Namely, the present embodiment 2 implies that the mask setting operation can be done when the accumulated binary image 804a assumes a suitable accumulation state, demonstrating that the burden imposed on the observer can be mitigated because the problem of difficulty in specifying such a region which appears only instantaneously or momentarily, which is difficult to detect when the accumulation is not employed, can be resolved, thereby further reducing the number of mask setting times. Further, in embodiment 1, even with the regions 701c and 701d where trees and grass rustle detected as a detection object, the mask setting operation by the operation marker 701a is merely applied to the region 701c only and so the observer must observe the display screen with a further mask setting operation in mind when the detection image 703c in FIG. 5C does not sufficiently cover the region 701d. But in the present embodiment 2, the detection object regions 801a and 801b in the image 801 in FIG. 7 are selected concurrently, demonstrating that such carefulness as above can be unneeded.

To add, in the accumulated binary image clear (reset) step 303, an accumulated binary image may be cleared (reset)

when the number of pixels assuming "255" in the accumulated binary image exceeds a predetermined value (for example, 1000 pixels). The present embodiment 2 can avoid the problem encountered in embodiment 1 that setting regions detected on and off as a masking region is difficult to achieve, thereby attaining the effect that detection regions occurring within a predetermined time can be set as a masking regions at a time.

Figure 8:
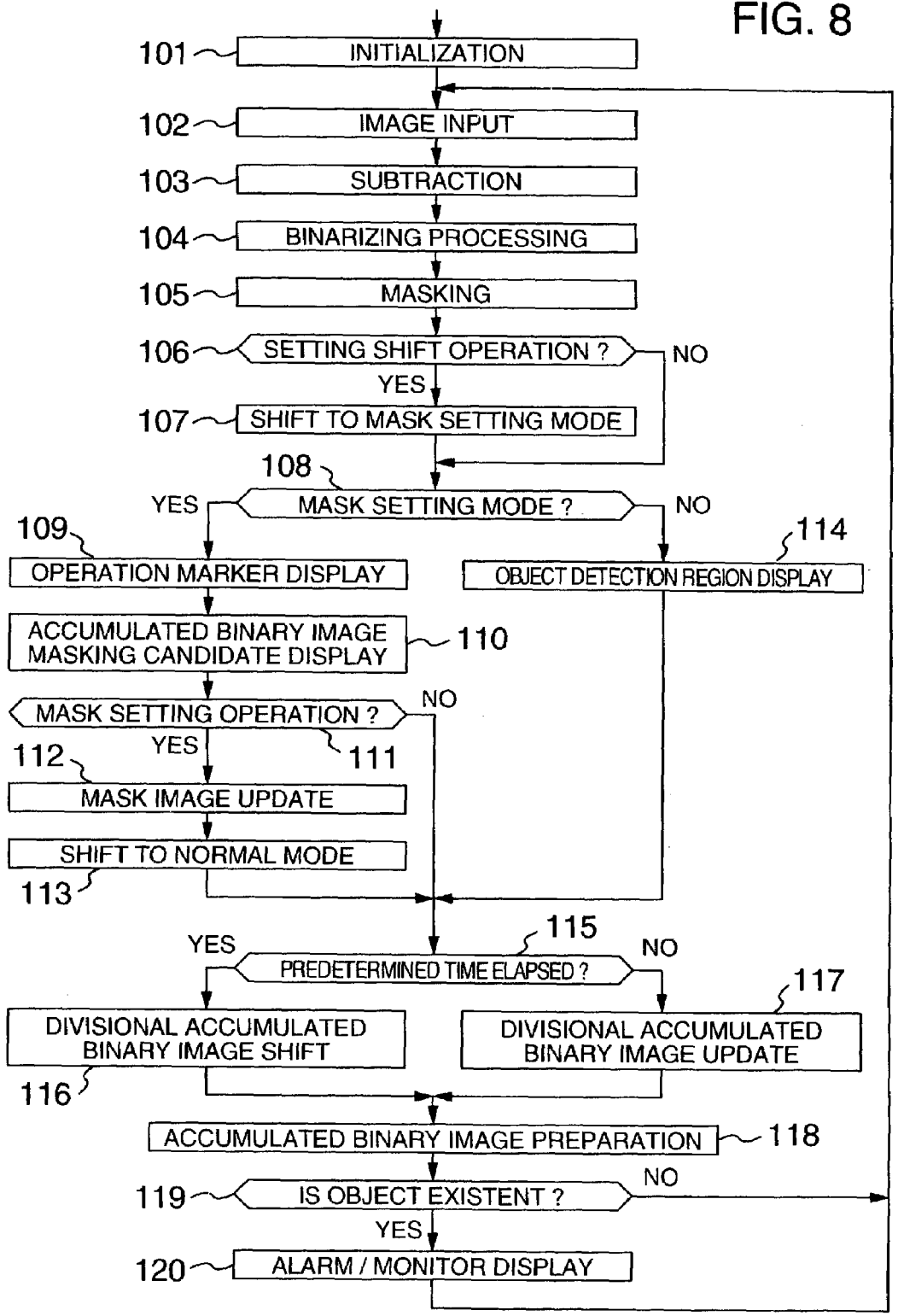
FIG. 8 is a flowchart showing a processing process according to embodiment 3 of the invention.

FIG. 8 is a flowchart showing a processing process according to embodiment 3 of the invention.

The embodiment 2 faces a problem that the accumulation time varies depending on timings of resetting (clearing) of the accumulated binary image and masking region setting operation and besides the accumulation time is sometimes shortened, that is, the accumulation time is decreased when the masking region setting operation is done immediately after the accumulated binary image is reset. Disadvantageously, with the accumulation time shortened, accumulation of the detected region becomes insufficient, failing to attain the above effect of the embodiment 2 purporting that detection regions within the predetermined time can be set as a masking region at a time. The present embodiment 3 solves the above problem. According to the present embodiment 3, in accumulated binary image masking candidate display step 110, an accumulated binary image prepared in accumulated binary image preparing step 118 (to be described later) is displayed, as a masking candidate region on the output monitor E06 through the image output I/F (E05f). Further, the accumulated binary image update step 301, predetermined time lapse decision step 302 and accumulated binary image clear step 303 in the embodiment 2 are deleted and instead, predetermined time lapse decision step 115, divisional binary image shift step 116, divisional binary image update step 117 and accumulated binary image preparing step 118 are added. Other steps than the above are similar to those in embodiment 2 explained in connection with FIG. 6 and will not be described.

In the predetermined time lapse decision step 115, when a predetermined time, for example, 10 minutes has passed from the start of accumulation, the program branches to the divisional accumulated binary image shift step 116 but when the predetermined time has not passed, the program branches to the divisional accumulated binary image update step 117. A divisional accumulated binary image is stored in the image memory E05e and this is obtained by dividing the accumulated binary image explained in embodiment 2 at intervals of a plurality of time sections. For example, in the present embodiment 3, the total accumulation time is 30 minutes and the accumulation time of a divided accumulated binary image is 10 minutes. The accumulated binary image to be accumulated between not less than 0 minute and less than 30 minutes is divided into three images having an accumulation duration between 0 minute and less than 10 minutes, an accumulation duration between not less than 10 minutes and less than 20 minutes and an accumulation duration between not less than 20 minutes and less than 30 minutes, respectively, to provide a divisional accumulated binary image. The following description will be given by way of example of three divisions. Assumptively, resulting images are represented by divided accumulated binary image B1, divided accumulated binary image B2 and divided accumulated binary image B3.

In the divisional accumulated binary image shift step 116, copy and reset operations are carried out at intervals of predetermined time (in the present embodiment, every 10 minutes) in such a manner that the divided accumulated binary image B2 stored in the image memory E05e is copied to the divided accumulated binary image B1, the divided accumulated binary image B3 is copied to the divided accumulated binary image B2 and the divided accumulated binary image B3 is reset. In the divisional accumulated binary image update step 117, the logical sum of individual pixels of a masked binary image and individual pixels of the divided accumulated binary image B3 stored in the image memory E05e is calculated and a calculation result substitutes for the divided accumulated binary image B3 stored in the image memory E05e. In the accumulated binary image preparing step 118, the logical sum of individual pixels of the divided accumulated binary image B1, those of the divided accumulated binary image B2 and those of the divided accumulated binary image B3 is calculated and a calculation result substitutes for the accumulated binary image stored in the image memory E05e.

This gives rise to effects to be described below with reference to FIGS. 9A and 9B.

Figure 9A:
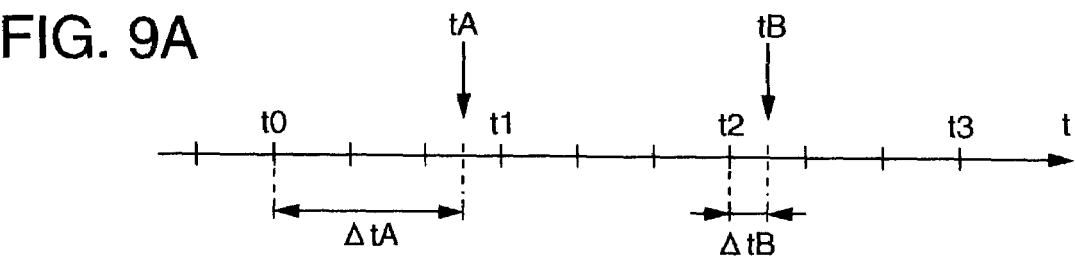
FIGS. 9A and 9B are diagrams for explaining effects of the embodiment 3.

Illustrated in FIG. 9A is an example of timings of update of the accumulated binary image and of mask setting operation in the embodiment 2. In FIG. 9A, the accumulated binary image is reset at timings of times t0, t1, t2, t3, . . . of a constant period. In embodiment 3, $t_i - t_{(i-1)} = 30$ minutes is assumed. Under this condition, the mask setting operation is done at time points tA and tB. In this example, time between the start of accumulation of an accumulated binary image and the mask setting operation amounts to periods ΔtA or ΔtB. This teaches that the accumulation time varies disadvantageously depending on the timings of the resetting of accumulated binary image and the masking region setting operation, thus implying that, as compared to the timing tA, the timing tB in which accumulation is made only during the time period ΔtB, is insufficient for the display of candidates for the masking region setting operation. In other words, due to insufficient accumulation, there may arise a case in which it is difficult to specify a region which appears instantaneously or momentarily giving rise to a problem in the embodiment 2.

Figure 9B:
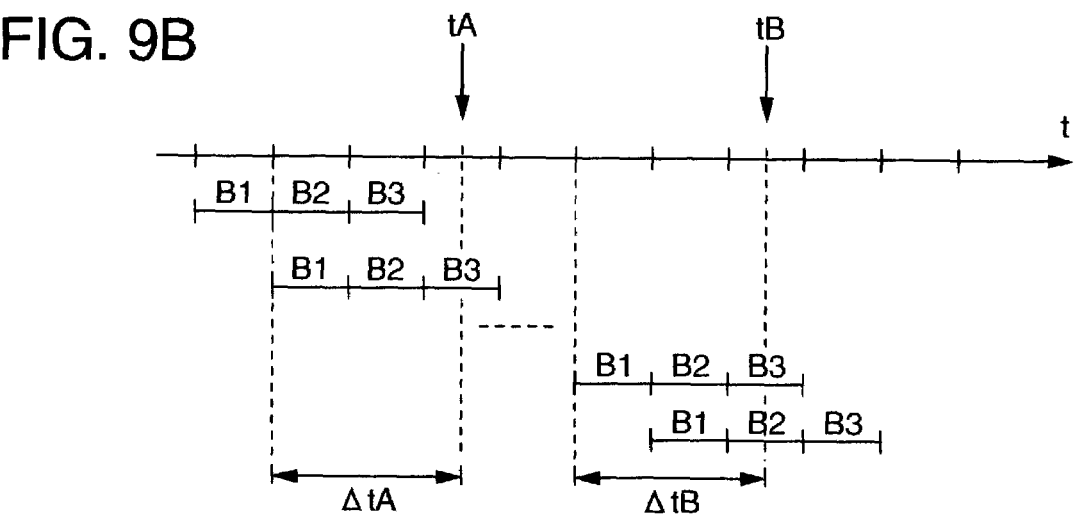

Turning to FIG. 9B, a solution based on embodiment 3 to elimination of variations in the accumulation time faced in the embodiment 2 is diagrammatically depicted. In the figure, B1, B2 and B3 represent divided accumulate binary images B1, B2 and B3, respectively. In the accumulated binary image preparing step 118, an accumulated binary image is obtained by calculating the logical sum of individual pixels of the divided accumulated binary image B1, those of the divided accumulated binary image B2 and those of the divided accumulated binary image B3. Further, in the divisional accumulated binary image shift step 116, the individual divided accumulated binary images are shifted at intervals of predetermined times. Accordingly, even when the mask setting operation is carried out at time point tA or tB, the number of divided accumulated binary images targeted as an accumulated binary image remains unchanged. Consequently, time (period) running from the start of accumulation of the accumulated binary image until the mask setting operation is done amounts to ΔtA or ΔtB, thus making the difference almost zero. In this manner, the problem raised in embodiment 3 that the accumulation time varies with timings of the resetting of accumulated binary image and the masking region setting operation can be avoided and sufficient accumulation time can be assured, so that partial detection regions within the predetermined time can advantageously be set as a masking region at a time.

The foregoing embodiments 1 to 3 are made from the standpoint of setting the masking region more suitably by utilizing the detection image. But the fact that the masking region set by utilizing the detection image personates on the other hand as a region to be observed originally is undeniable. Accordingly, in embodiments 4 and 5 to be described hereinafter, examples will be proposed which can release the masking region to provide a more suitable watch region.

Figure 10:
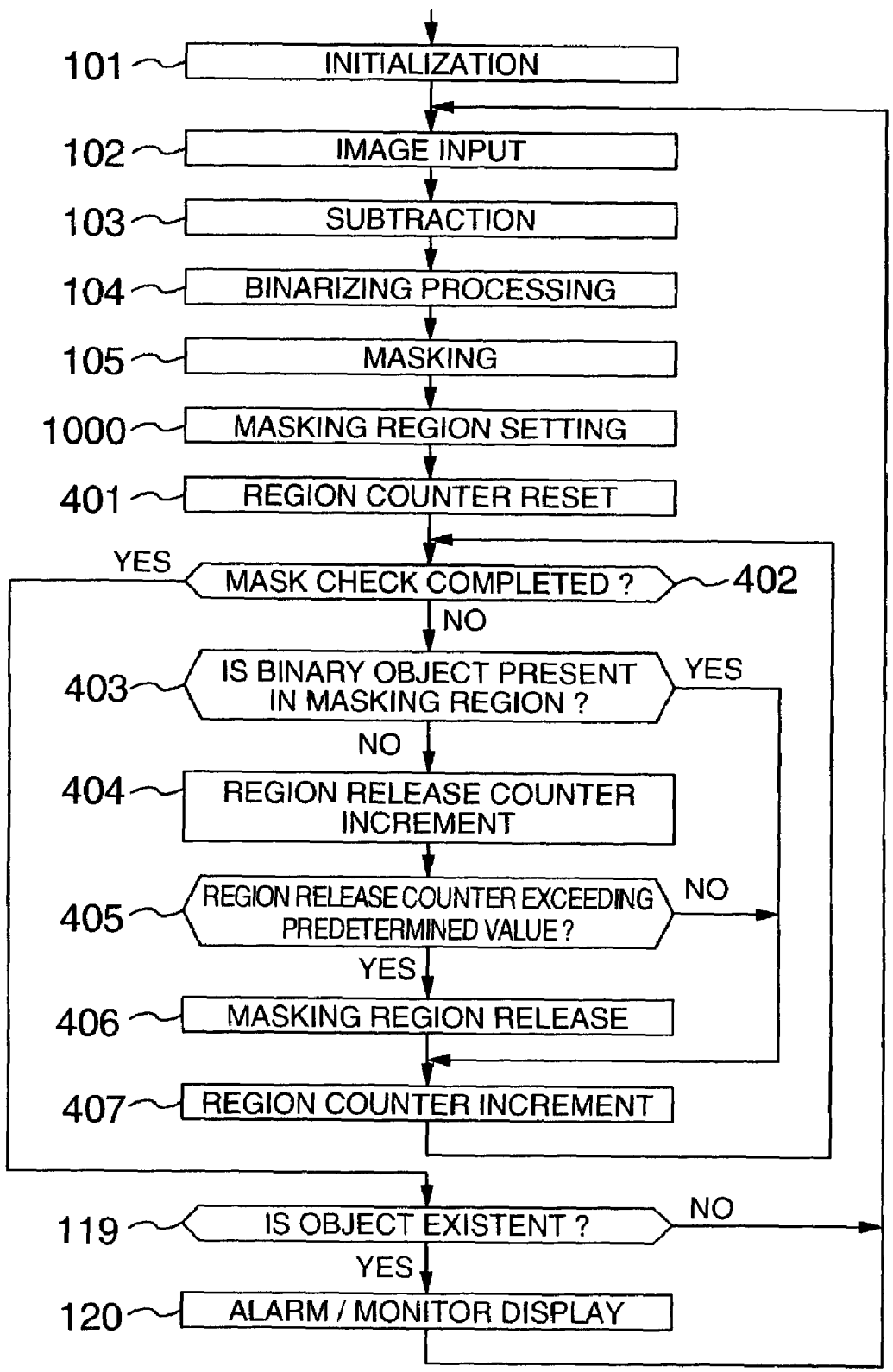
FIG. 10 is a flowchart for explaining a processing process according to embodiment 4 of the invention.

FIG. 10 is a flowchart for explaining a processing process according to embodiment 4 of the invention. The processing executed through steps 101 to 105 is the same as that in the foregoing embodiments 1 to 3. Masking region setting step 1000 collectively indicates a masking region setting process carried out through the setting shift operation decision step 106 and the ensuing steps which end in the step preceding the object existence decision step 119 in the foregoing embodiments 1 to 3. The object existence decision step 119 and alarm/monitor display step 120 are also the same as those in the foregoing embodiments 1 to 3. Namely, in the present embodiment 4, in addition to the masking region setting and object detection processes in the foregoing embodiments 1 to 3, steps to be described below, which begin with region counter reset step 401 and terminate in region counter increment step 407, are added to make it possible to release the masking region as necessary. More particularly, in the present embodiment 4, the monitoring view field is divided into a plurality of blocks and the steps ranging from region counter reset step 401 to region counter increment step 407 are added to the mask region setting and object detection processes in the foregoing embodiments 1 to 3, so that the masking region can be released block by block as necessary. Accordingly, the processing executed through steps 101 to 105, the object existence decision step 119 and the alarm/monitor display step 120 will not be described here.

Figure 11A:
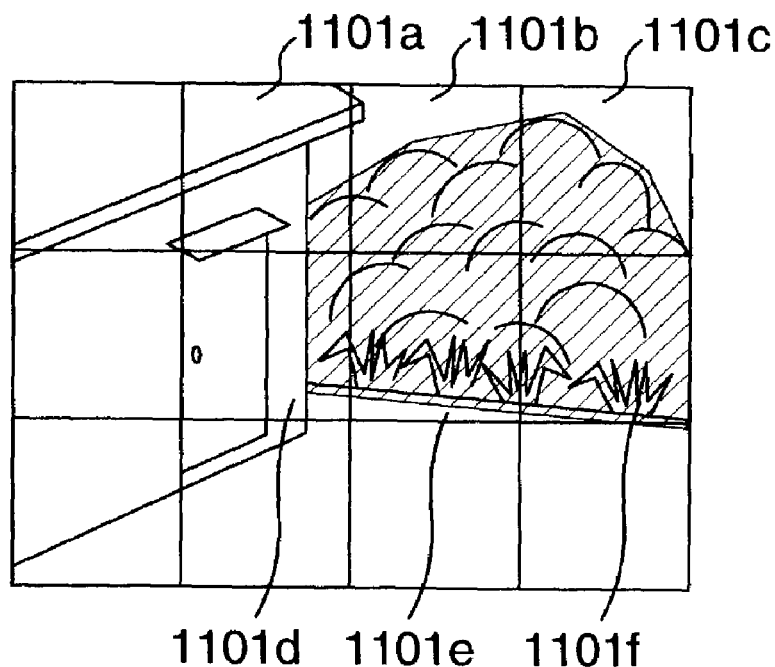
FIGS. 11A and 11B are diagrams for explaining an example of releasing the masking region executed on the basis of divided blocks in the embodiment 4.

In the region counter reset step 401, a region counter held in the work memory E05*j* is reset to, for example, zero. This region counter is used to execute the following steps 402 to 407 in respect of each masking region set in accordance with the foregoing embodiments 1 to 3. In the present embodiment 4, the monitoring image region is divided into rectangular blocks consisting of, for example, four horizontal blocks and three longitudinal blocks as shown in FIG. 11A.

More specifically, when the image size is of, for example, 320 horizontal pixels (positions of the pixels are indicated by x=0 to 319) and 240 longitudinal pixels (positions of the pixels are indicated by y=0 to 239), the image is divided by pixel groups indicated by x=0 to 79, 80 to 159, 160 to 239 and 240 to 319, respectively, in the horizontal direction and by pixel groups indicated by y=0 to 79, 80 to 159 and 160 to 239, respectively, in the longitudinal direction. In this manner, the image can be divided into 4 rectangular blocks in the horizontal direction and 3 rectangular blocks in the longitudinal direction, totaling 12 rectangular blocks. This block division is determined in the case of setting the monitoring view field. Of these 12 blocks, 6 blocks are included in a region containing the masking region. In other words, in an example of FIG. 11A, a masking region set by using the detection image as explained with reference to FIG. 5 includes 6 blocks 1101*a* to 1101*f*. These divisional blocks are handled independently by using the region counter. In the example of FIG. 11A, values 0, 1, 2, 3, 4 and 5 of the region counter are allotted to the 6 blocks 1101*a* to 1101*f*, respectively.

In the mask check completion decision step 402, the value of the region counter is compared with the number of the divisional masking regions. When the value of the region counter exceeds the number of the divided masking regions (6 in the example) (note that the region counter value being larger than the number of the masking regions means that the process (mask check) is completed for all the divided masking regions), the program branches to the object existence decision step 119 but when the value of the region counter is less than the number of the divided masking regions, the program branches to the intra-masking region object existence decision step 403. Next, In the intra-masking region object existence decision step 403, it is decided, on the basis of a divided masking region designated by the region counter stored in the work memory E05*j* and a binary image stored in the image memory E05*e*, whether a detection image (a pixel group having pixel value "255" in the binary image) exists in the divided masking region.

During this decision, information as to which pixels belong to the target divided block can be obtained directly from calculation of coordinates of the target pixels when the monitoring view field is divided into the rectangular blocks as in the example of FIG. 11. In the intra-masking region object existence decision step 403, this information is used to identify pixels in a block noticed at present and it is decided in respect of the identified pixels whether a detection object exists in the divided masking region. In the absence of any detection object in the divided masking region, the program branches to the region release counter increment step 407 but in the presence of any detection object, the program branches to the region counter increment step 404.

Next, in the region release counter increment step 404, a region release counter corresponding to the masking region designated by the region counter and stored in the work memory E05*j* (namely, region release counters exist equally in number to the number of divided masking regions, that is, 6 in the present embodiment) is increased by one in value. Further, in the region release counter decision step 405, when the region release counter stored in the work memory E05*j* counts a value not less than a predetermined value (for example, 6000 frames), the program branches to the masking region release step 406 but when the value is less than the predetermined value, the program branches to the region counter increment step 407. Next, in the masking region release step 406, a masking region corresponding to the region counter stored in the work memory E05*j* is released and the region release counter is cleared. In the masking image in the foregoing embodiments 1 to 3, pixels corresponding to a masking region are set to "0" and pixels corresponding to a region other than the masking region are set to "255". Therefore, releasing the masking region is accomplished by replacing the value of all pixels in a masking region corresponding to the region counter with "255". A newly prepared masking region substitutes for the masking image stored in the work memory E05*j*, thus completing update of the masking region.

As will be seen from the above, the region release counter stored in the work memory E05*j* increases when no detection image exists in a divided masking region designated by the region counter and if it counts a value exceeding a predetermined value, that is, if any detection image is not detected over a predetermined number of frames, the divided masking region is released from the masking target. On the assumption that an input image of 10 frames is processed every second when the above predetermined value is set to 6000 frames, the divided masking region is excluded from the masking region when any detection image is not detected continuously for not less than 600 seconds.

Figure 11B:
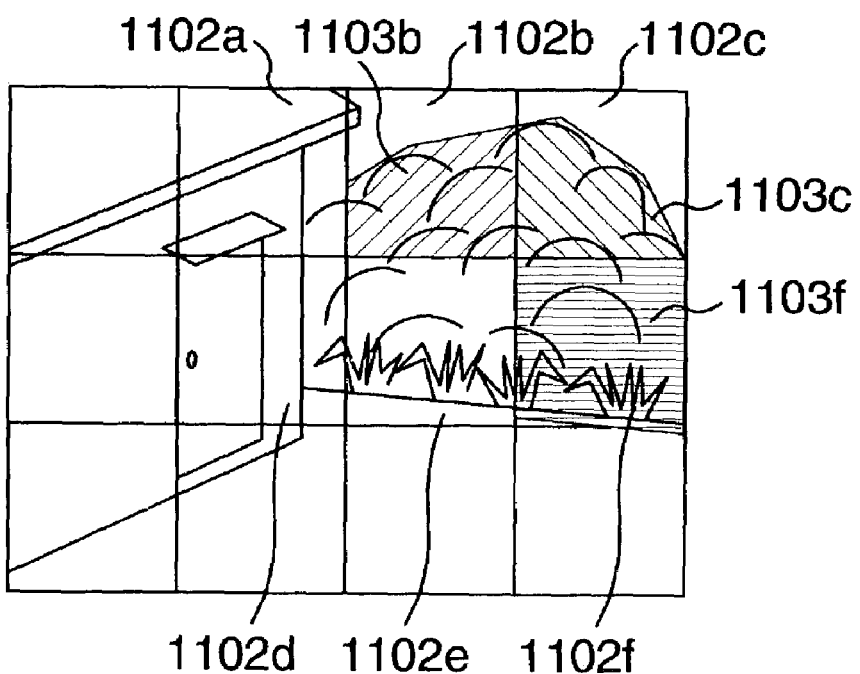

This will be described more specifically with reference to FIG. 11B. An example of FIG. 11B shows that in the divided masking regions in the blocks 1102*a*, 1102*b*, 1102*c*, 1102*d*, 1102*e* and 1102*f* blocks corresponding to respective divided blocks 1101*a*, 1101*b*, 1101*c*, 1101*d*, 1101*e* and 1101*f* set in the masking region in FIG. 11A, any detection image is detected only less than the predetermined number of frames in the blocks 1102*a*, 1102*d* and 1102*e*. In this case, the divided masking region blocks 1102*a*, 1102*d* and 1102*e* are released from the masking regions and only the divided masking regions 1103*b*, 1103*c* and 1103*f* remain as masking regions. In other words, as the wind falls and any detection image becomes not detected (as the difference in brightness between the input image and the reference background image decreases) in a divided region, that region is automatically released from the masking regions.

Figure 12A:
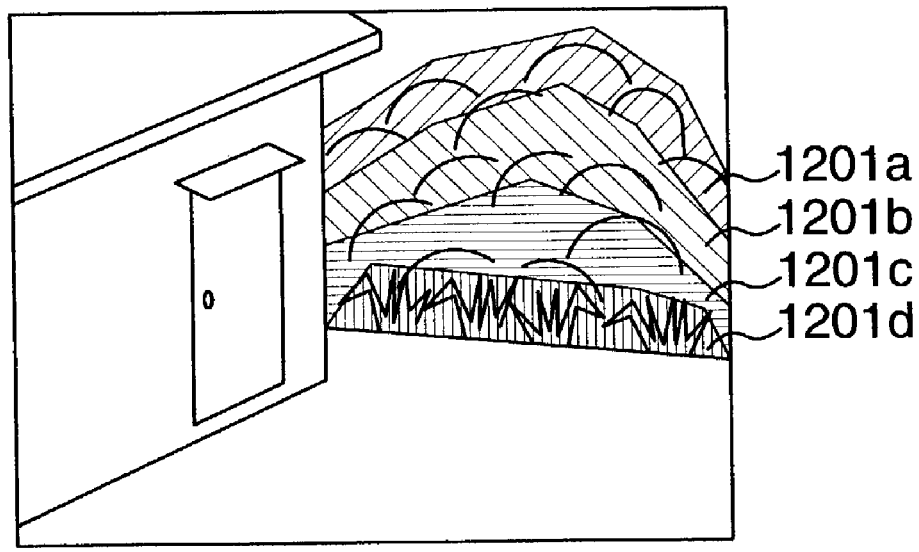
Figure 12B:
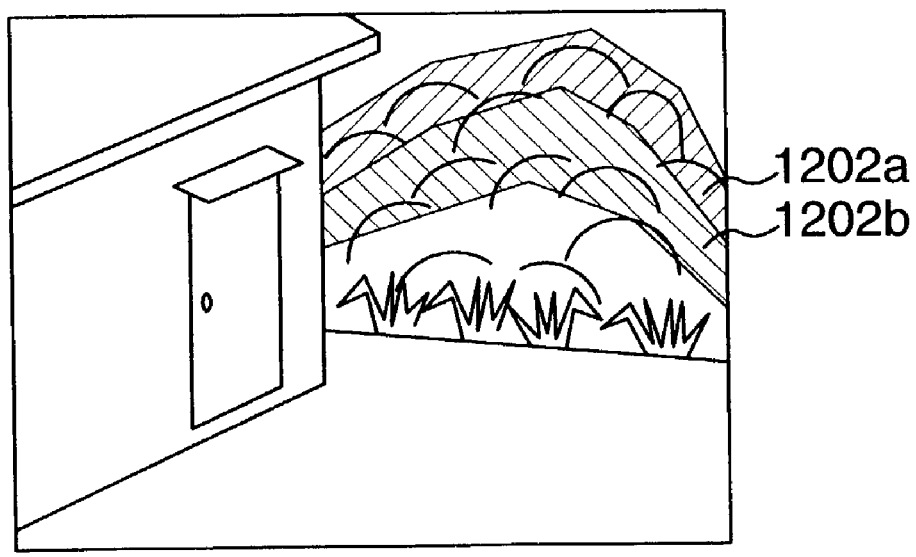

In the example of FIGS. 11A and 11B, the masking region is divided into rectangular blocks. In an example of FIGS. 12A and 12B, however, looking at the fact that an upper portion of trees, for instance, rustles more intensively in the wind, the block division is made in accordance with the degree of rustling of trees. In this case, information as to which pixels belong to which one of blocks is determined in the phase of setting the monitoring view field (namely, as will be described later, an image having its pixel value representing a block number is recorded on the image memory E05*e*), the information is read in the initialization step 101 during execution of a monitoring process and while identifying, on the basis of the region counter in the intra-masking region object existence decision step 403, that target pixels belong to a block of concern at present, the presence of an object in a masking region is decided. The division may alternatively be made based on, for example, personal evaluation of the degree of rustling of trees (the number of pixels corresponding to the rustling branches of trees on the image) by the operator's eyes. The division may further alternatively be made based on classifying images into an image rustling at the wind speed of 2 m/s, an image not rustling at the wind speed of 2 m/s, but rustling at 4 m/s, an image not rustling at the wind speed of 4 m/s, but rustling at 6 m/s. Further, the information as to which pixels belong to which one of blocks can be expressed by using not only the image form but also the form of a polygon having a plurality of vertexes. In FIG. 12A, when any detection image is not detected over a predetermined number of frames at divided blocks 1201*c* and 1201*d* in divided blocks 1201*a*, 1201*b*, 1201*c* and 1201*d*, the blocks 1201*c* and 1201*d* are released from the masking regions and only divided masking regions 1202*a* and 1202*b* remain as masking regions.

Next, in the region counter increment step 407, the region counter stored in the work memory E05*j* is increased. In other words, the divided masking region representing a target of masking region release decision shifts to a divided masking region designated by a newly updated region counter.

The processing executed in object existence decision step 119 and alarm/monitor display step 120 is the same as that in the foregoing embodiments 1 to 3.

In case the masking region is divided into blocks in accordance with the degree of rustling of trees as shown in the example of FIG. 12A, an image having its pixel value indicative of the block number can be used as an example of the information as to which pixels belong to which one of blocks and this will be described below.

Firstly, the block number will be described. In the case of the rectangular block as shown in FIG. 11A, individual blocks are numbered sequentially, for example, from left above in order of 0, 1, 2, . . . These numbers are block numbers. In the case of a non-rectangular block as shown in FIG. 12A, the blocks can be numbered, for example, in order of setting of individual blocks or in order of magnitude of the number of pixels. This numbering can also be applied to blocks including only masking regions (in FIG. 11A, numbers are allocated to only the blocks including the masking regions). In short, it is sufficient that individual blocks including masking regions can be discriminated by block numbers from each other.

Figure 12C:
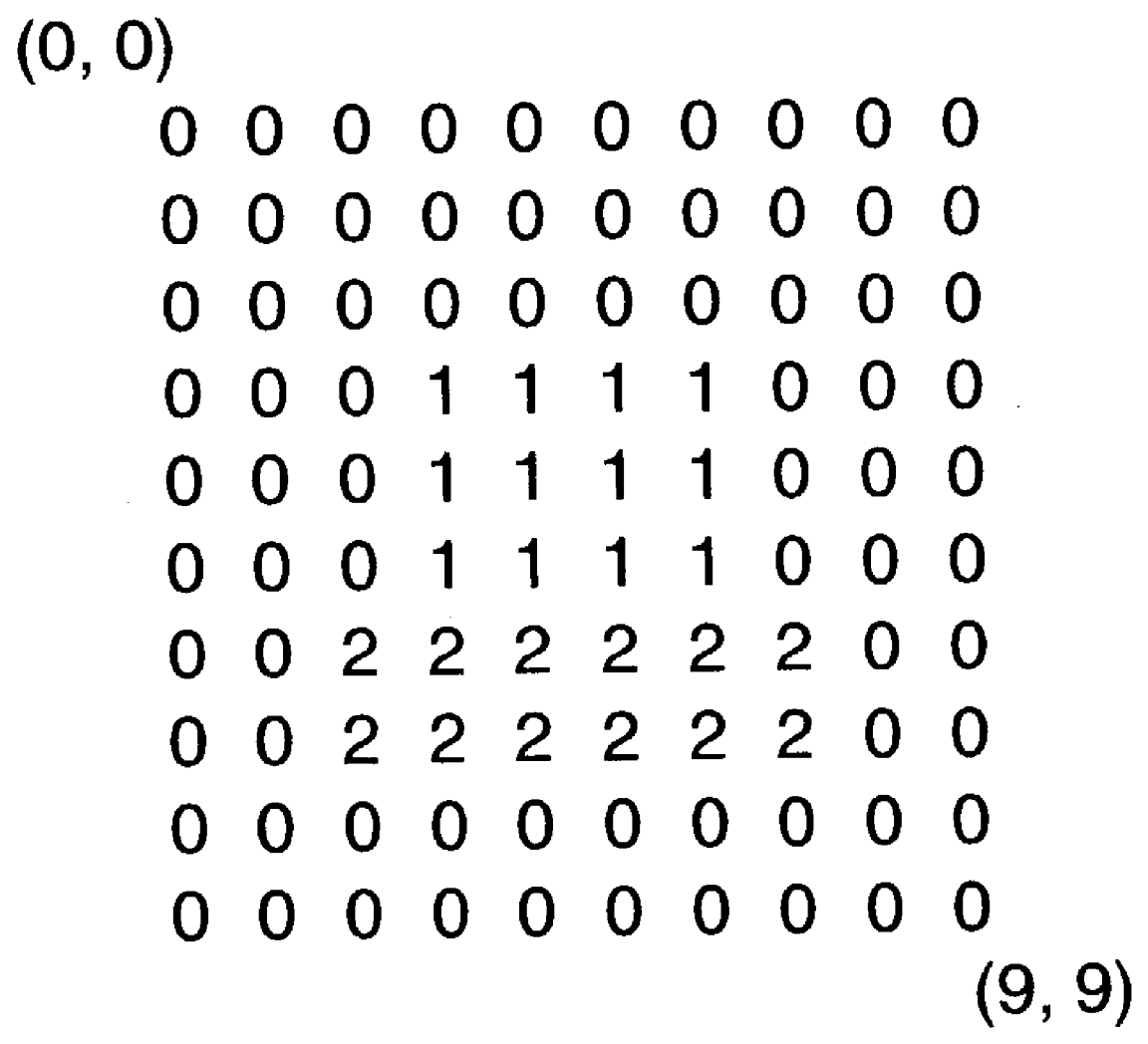

Next, on the assumption that one pixel is of 8 bits, individual pixels of an image can have values of from 0 to 255. By utilizing this characteristic, the pixel value of each pixel can be expressed as a block number to which each pixel belongs. Accordingly, an image in which the pixel value indicates a block number is an image having the block number recorded in place of brightness values (pixel values). For example, when an image of 10 longitudinal pixels and 10 horizontal pixels is considered, the image can be prepared so as to have pixel values as shown in FIG. 12C, indicating that 3 blocks exist in this image (monitoring view field) and individual blocks are:

Block number 0: pixels other than block number 1 and block number 2,
Block number 1: pixels of a region of coordinates (3, 3) to (6, 5), and
Block number 2: pixels of a region of coordinates (2, 6) to (7, 7).

As described above, by dividing the masking region and deciding a detection image in the individual divided regions, a suitable masking region can be set automatically without resort to masking region switching by the operator when the region to be subjected to the masking process becomes small owing to, for example, falling of the wind and so an intruding object can be detected accurately.

In the present embodiment 4, division of the masking region into blocks is not limited to the examples described above and the masking region may be divided into arbitrary forms so that division may be made in a region added to a masking region through one setting operation pursuant to the mask setting operation explained in connection with the embodiments 1 to 3.

Figure 13:
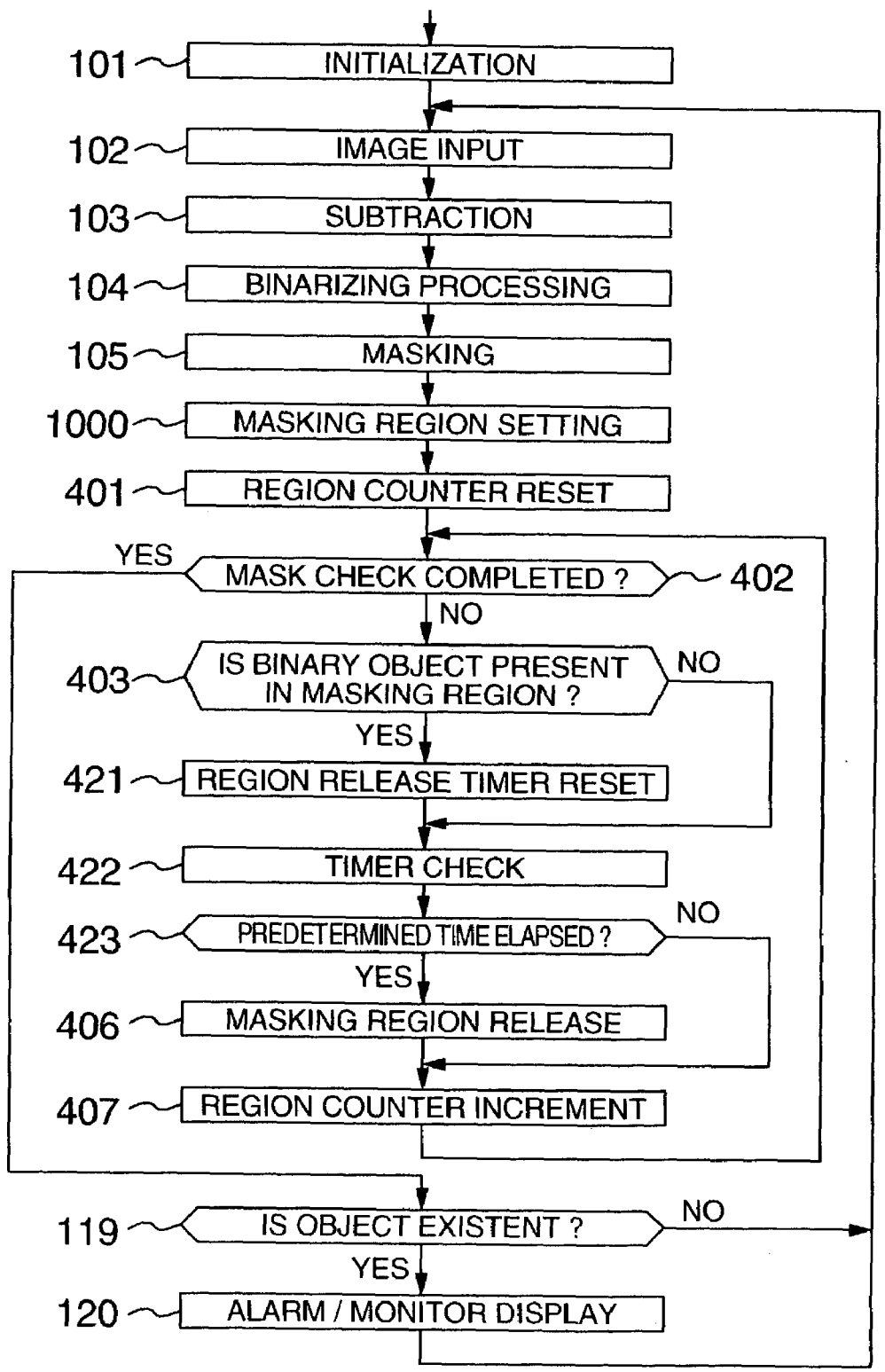
FIG. 13 is a flowchart for explaining a processing process according to embodiment 5 of the invention.

FIG. 13 is a flowchart for explaining a processing process according to embodiment 5 of the invention.

In the embodiment 4, the masking region is released on the basis of the number of frames over which any detection image is not detected in a divided masking region but in the present embodiment 5, a divided masking region is released on the basis of a time lapse starting with the final detection of a detection image in the divided masking region. In the present embodiment 5, flow of intra-masking region object existence decision step 403, region release timer reset step 421, timer check step 422 and predetermined time lapse decision step 423 substitute for the intra-masking region object existence decision step 403, region release counter increment step 404 and region release counter decision step 405 in the embodiment 5. Other steps than the above are the same as those in the embodiment 4 explained in connection with FIG. 10 and will not be described.

As in the case of the embodiment 4, in the intra-masking region object existence decision step 403, it is decided, on the basis of a divided masking region designated by a region counter stored in the work memory E05*j* and a binary image stored in the image memory E05*e*, whether a detection image (a pixel group having pixel value "255" in the binary image) exists in the divided masking region. If a detection image exists in the divided masking region, the program branches to the region release timer resetting step 421 but in the absence of any detection image, the program branches to the timer check step 422. In the region release timer resetting step 421, a region release timer of a masking region corresponding to the divided masking region block designated by the region counter is reset. Subsequently, in the timer check step 422, a time lapse from resetting of the region release timer corresponding to the divided masking region designated by the region counter is calculated. Conveniently, this process is carried out by the timer function of the CPU E05h but if any timer of the CPU E05h is unavailable, an external timer may be used. Next, in the predetermined time lapse decision step 423, when it is determined that the time elapse comes to a predetermined time (for example, 10 minutes), on the basis of the time lapse, calculated in the timer check step 42, from resetting of the region release timer corresponding to the divided masking region designated by the region counter, the program branches to the masking region release step 406 but when the predetermined time lapse is not determined, the program branches to the region counter increment step 407.

As will be seen from the above, the masking region is divided to permit a detection image in each divided masking region to be decided and the masking region is released on the basis of the time lapse from the final detection of a detection image in the detection region, so that when the wind falls and the region to be subjected to the masking process becomes small, an unnecessary masking region can be released steadily on the basis of a time lapse from falling of the wind. Accordingly, a suitable masking region can be set automatically and accurate detection of an intruding object can be carried out.

According to the above embodiments, since, in the masking region setting for preventing reflection of light from water pool from being detected, a masking region can be designated on the basis of an operation for designating a detection object region obtained from the object detection process, the mask setting operation can be simplified and suitable setting can be assured. Further, in accordance with a change in situations, the conditions of the absence of any detection object can suitably be decided as necessary to release the masking region.

Next, another embodiment of the invention will be described.

Figure 14:
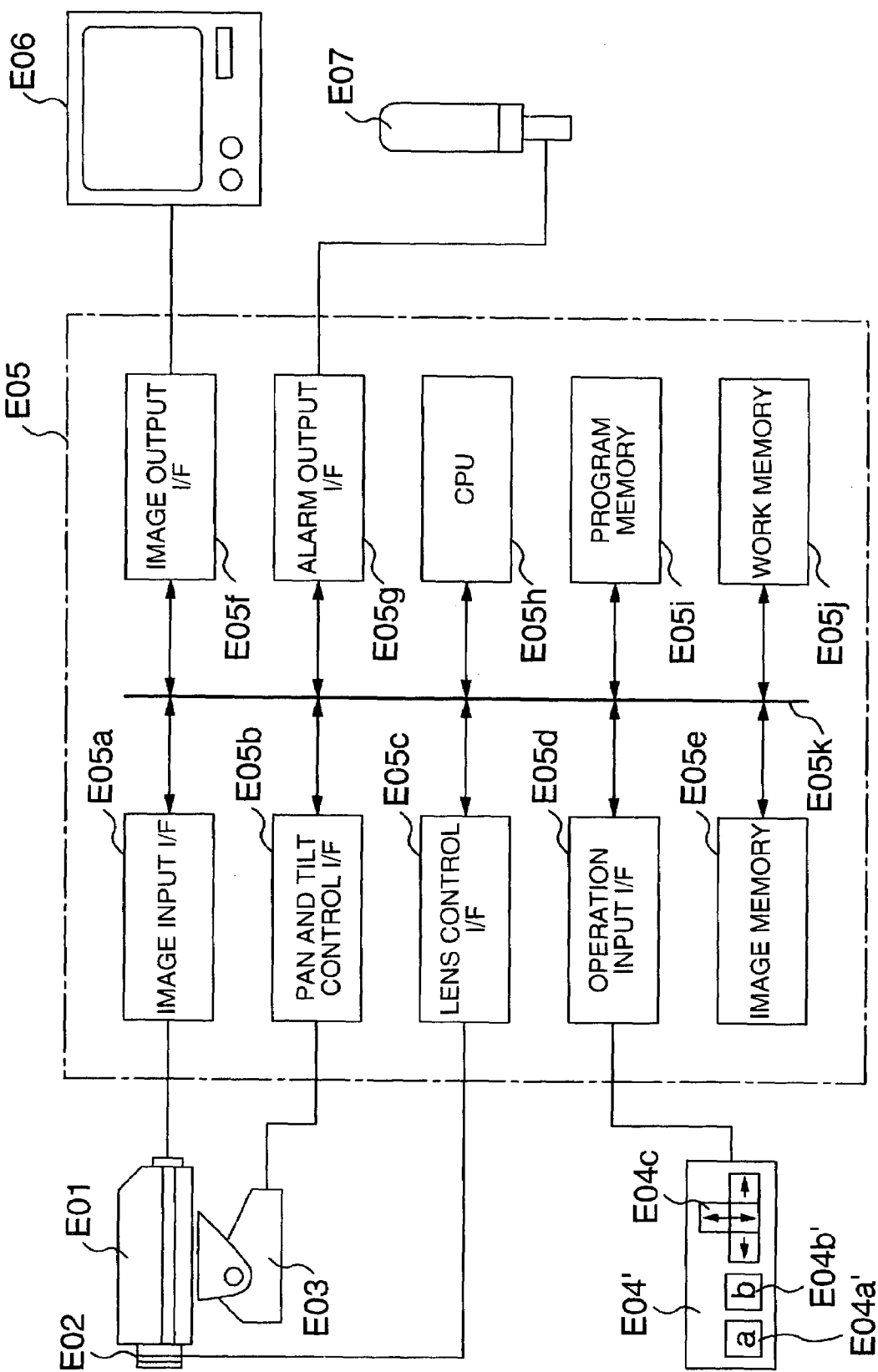
FIG. 14 is a block diagram showing the hardware construction of an object detection apparatus according to embodiment 6 of the invention.

FIG. 14 shows the hardware construction of an object detection apparatus according to embodiment 6 of the invention. The hardware construction of the FIG. 14 embodiment is the same as that of FIG. 3 except for an operation unit or operation input unit E04'.

In FIG. 14, the operation unit E04' has a first button E04a', a second button E04b' and a direction key (cursor key or arrow key) E04c attached to the operation unit E04'. Other members will not be described herein. The first and second buttons E04a' and E04b' may be buttons having functions comparable to those of the buttons E04a' and E04b' in FIG. 3, respectively.

The FIG. 14 hardware construction of the object detection apparatus will be used to give a description of embodiments to be described hereinafter.

Figure 15:
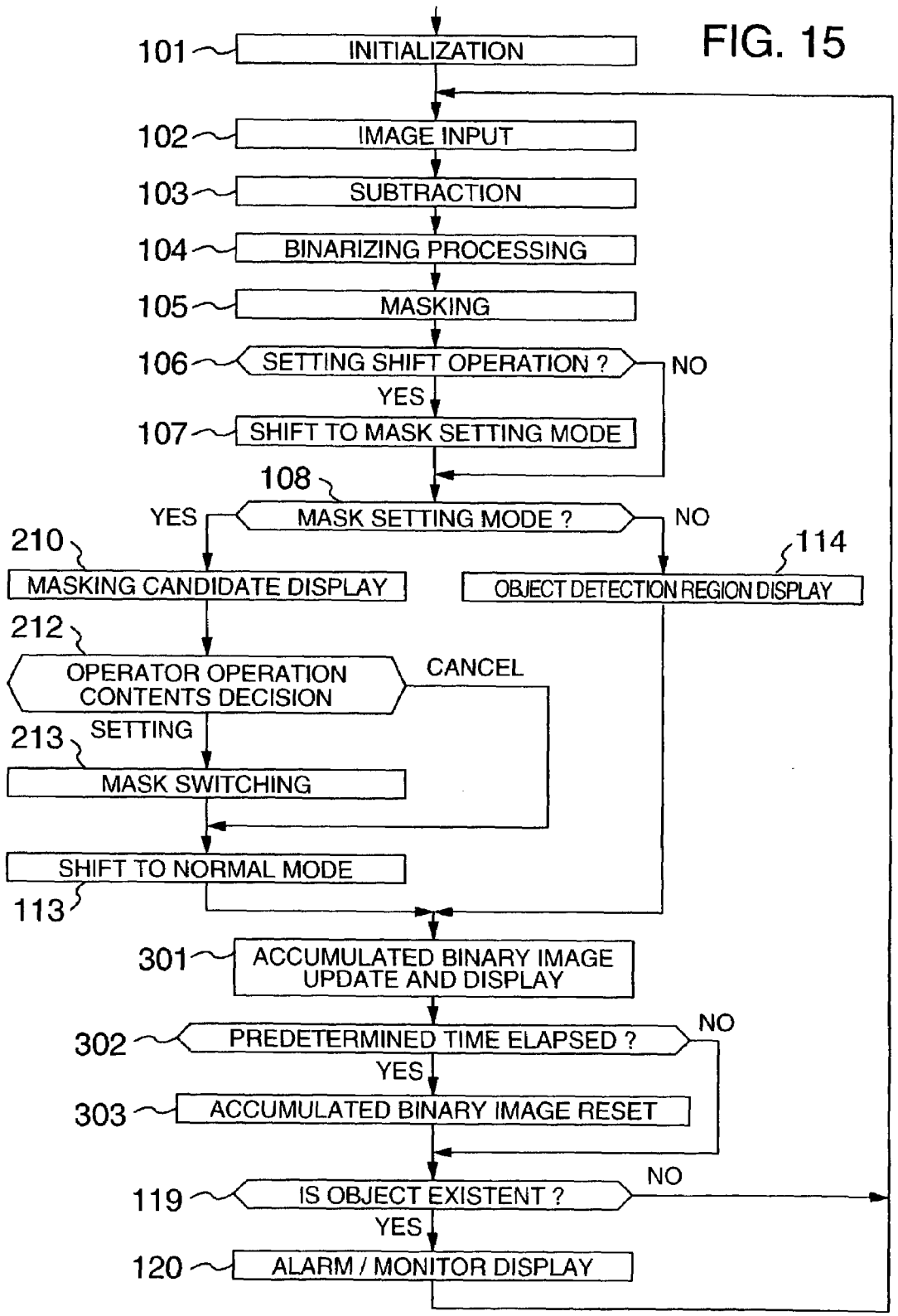
FIG. 15 is a flowchart showing a processing process according to embodiment 7 of the invention.

FIG. 15 is a flowchart showing a processing process according to embodiment 7 of the invention. In the present embodiment, when the operator selects a mask setting mode, a masking candidate is automatically generated periodically and repeatedly and displayed on the monitor E06. Accordingly, when the operator operates the operation input unit E04' at the time that a masking candidate considered to be preferable is displayed, the masking candidate can be set as a mask to enable the operator to set the mask through a more decreased number of operations than those in the previous embodiment.

Processing executed through step 101 to step 107 in the present embodiment 7 is the same as that in the embodiments explained in connection with FIGS. 4, 6 and 8 and so the following description will be given starting from the process of step 106 and other steps will not be described.

In the setting shift operation decision step 106, when the operator operates the operation input unit E04 and the processing mode is shifted to a mask setting mode, the program branches to the mask setting mode shift step 107 but when the processing mode is not shifted to the mask setting mode, the program branches to the masking mode decision step 108. Shifting to the mask setting mode is carried out by, for example, depressing the first button E904a' of the operation input unit E04. In the mask setting mode shift step 107, the processing mode is set to the mask setting mode. Next, in the mask setting mode decision step 108, when the processing mode managed by processing mode variables in the work memory Eo5j is the masking mode, the program branches to masking candidate display step 210 but when the processing mode is not the masking mode, the program branches to the object detection region display step 114.

Next, in the masking candidate display step 210, an accumulated binary image (its preparation method will be described later) is displayed as a masking candidate on the output monitor E06 through the image output I/F E05f. In the masking candidate display method, in order that comparison of an input image at present with a masking candidate portion can be made and studied easily, a display of the masking candidate portion may, for example, be superimposed transparently on the present image. In operator operation contents decision step 212, the operator observes the displayed masking candidate to make a decision as to whether the masking candidate is to be set as a masking region or to be cancelled. In case the masking candidate is set as the masking region in accordance with the contents of the operation of operation input unit E04' determined by the operator, the program branches to mask switching step 213 but when setting of the masking region is cancelled, the program branches to shift to normal mode step 113. For example, in the operation of operation input unit E04' by the operator, the first button E04a' of operation input unit E04' is depressed for setting the masking candidate as the masking region and the second button E04b' of operation input unit E04' is depressed for canceling setting of the masking region. Subsequently, in the shift to normal mode step 113, the processing mode is set to the normal mode.

In the object detection region display step 114, a binary image applied with, for example, a process for responding to the masking region is displayed on the output monitor E06 through the image output I/F E05f.

Processing executed through steps 301 to 303 is the same as that described in connection with FIG. 6 but to describe it again, in the accumulated binary image update step 301, the logical sum of individual pixels of a masked binary image obtained through the binarizing processing step 104 and masking step 105 and individual pixels of an accumulated binary image stored in the image memory E05e is calculated and a binary image obtained as a calculation result substitutes for the accumulated binary image stored in the image memory E05e. In this manner, a detection object region in which an object is detected on and off is recorded. The updated accumulated binary image obtained in the accumulated binary image update step 301 is displayed in the masking candidate display step 110.

Next, in the predetermined time lapse decision step 302, when a predetermined time (for example, 30 minutes) has elapsed from accumulation of the masked binary image, the program branches to the accumulated binary image reset step 303 but when the predetermined time has not elapsed, the program branches to the object existence decision step 119. In the accumulated binary image reset step 303, the accumulated binary image stored in the image memory E05e is reset. The accumulated binary image is reset periodically in this manner because if the accumulation continues, an object such as a human object to be observed and an object which is originally a target object to be observed and must not be masked will sometimes intrude into the monitoring region and its detection result will remain in the accumulated binary image for a long time.

Effects of the method for accumulation of the binary image will be described with reference to FIG. 7. In FIG. 7, reference numerals 801, 802 and 803 designate regions of detection objects at time points T0, T1 and T2 and in the individual regions 801, 802 and 803, display regions 801a, 801b, 802a and 803a of detection objects at the individual time points are displayed. By calculating data in the display regions 801a, 801b, 802a and 803a in the individual regions through the use of a logical sum means 805, an accumulated binary image 804a can be obtained. In this manner, the regions detected at individual time points are accumulated to provide a masking candidate. By selecting the masking candidate, the operator can easily set a mask through a small number of operations. In the accumulated binary image clear (reset) step 204, the accumulated binary image may be reset when the number of pixels assuming "255" in the accumulated binary image exceeds a predetermined value (for example, 1000 pixels).

Processing executed in the subsequent object existence decision step 119 is the same as that already described in connection with FIGS. 4, 6, 8 and so on and its description will not be given repeatedly for avoidance of prolixity.

Figure 16:
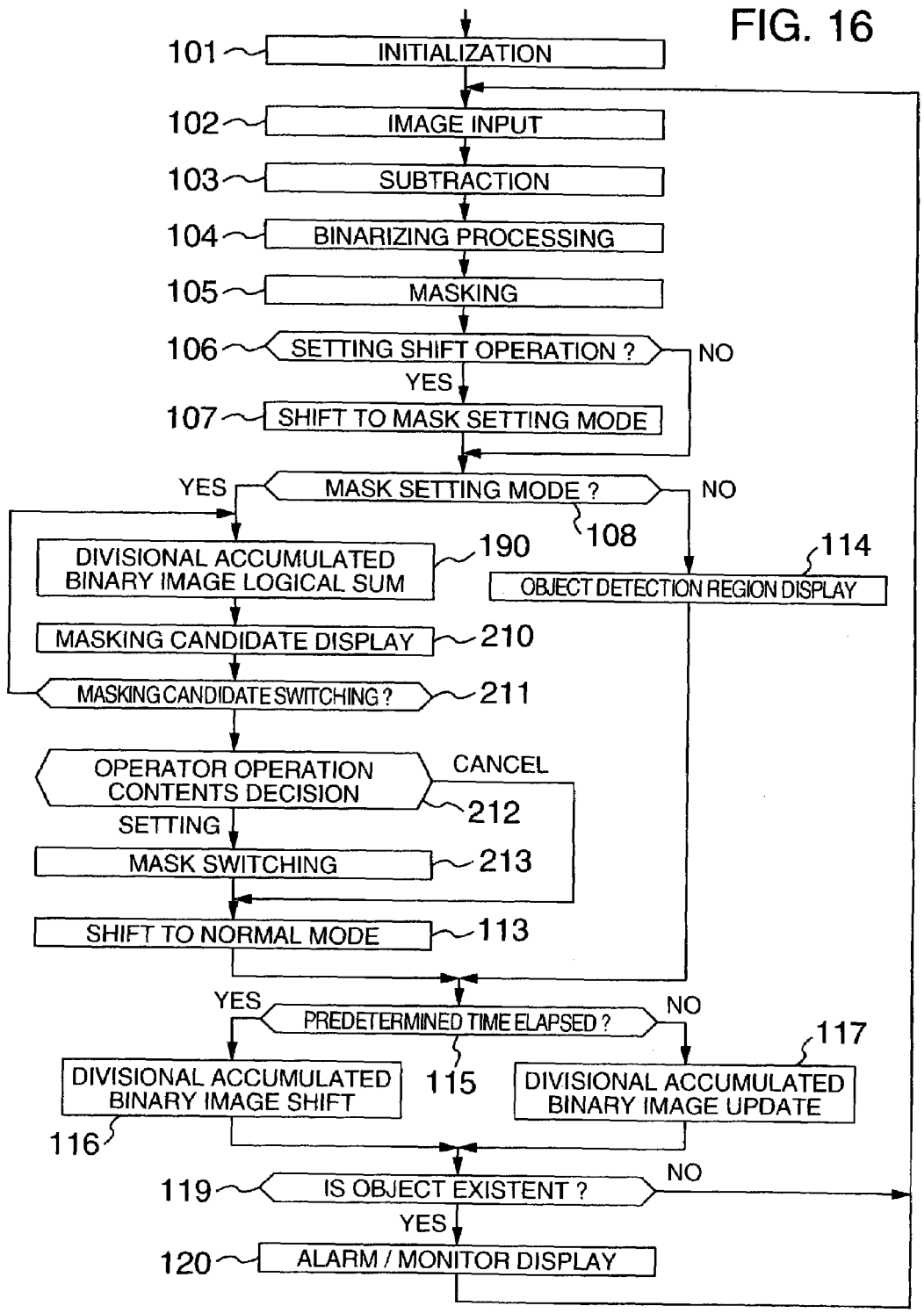
FIG. 16 is a flowchart showing a processing process according to embodiment 8 of the invention.

Referring now to FIG. 16, embodiment 8 of the invention will be described. FIG. 16 is a flowchart for explaining a processing process in embodiment 8 of the invention.

In the present embodiment 8, a plurality of masking candidates are prepared in contrast to the single masking candidate in embodiment 7 and a masking candidate used for mask setting is selected from the plurality of masking candidates. In the present embodiment 8, the accumulated binary image update step 301, predetermined time lapse decision step 302 and accumulated binary image clear step 303 in embodiment 7 are deleted and instead, divisional accumulated binary image logical sum step 190, masking candidate switching decision step 211, predetermined time lapse decision step 115, divisional accumulated binary image shift step 116 and divisional accumulated binary image update step 117 are added. Other steps are the same as those in the embodiment 7 explained in connection with FIG. 15 and will not be described herein.

Figure 17A:
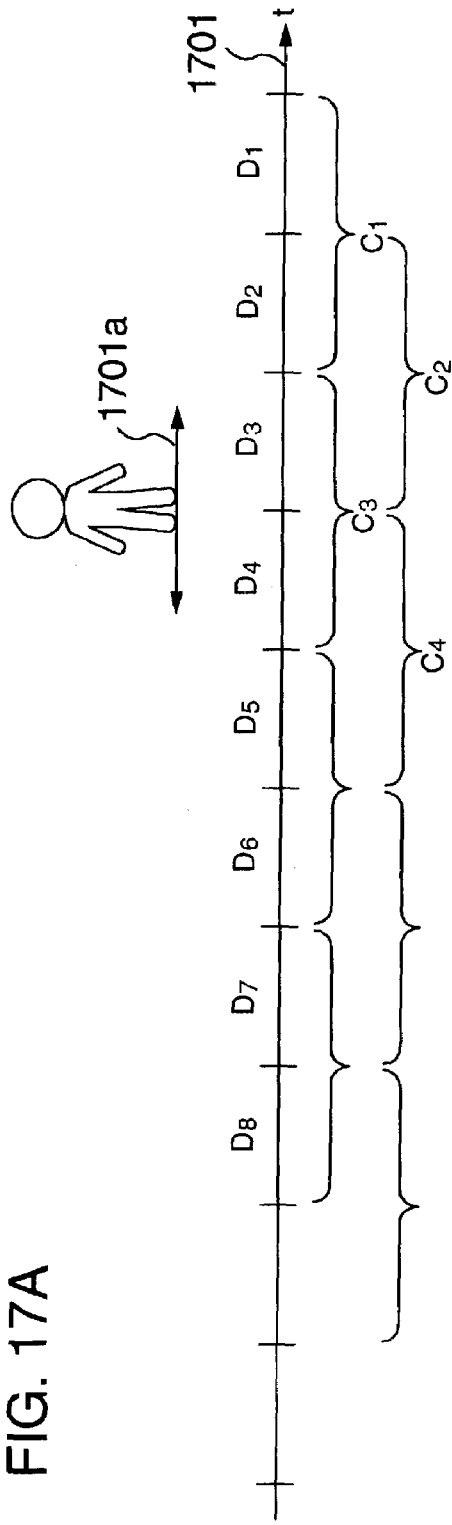
FIGS. 17A to 17D are diagrams useful to explain a process for obtaining a masking candidate image from divided accumulated binary images, with FIG. 17A showing a first example of the process, FIG. 17B showing a second example of the process and FIGS. 17C and 17D showing examples of masking candidate images obtained through the respective examples of the process.
Figure 17B:
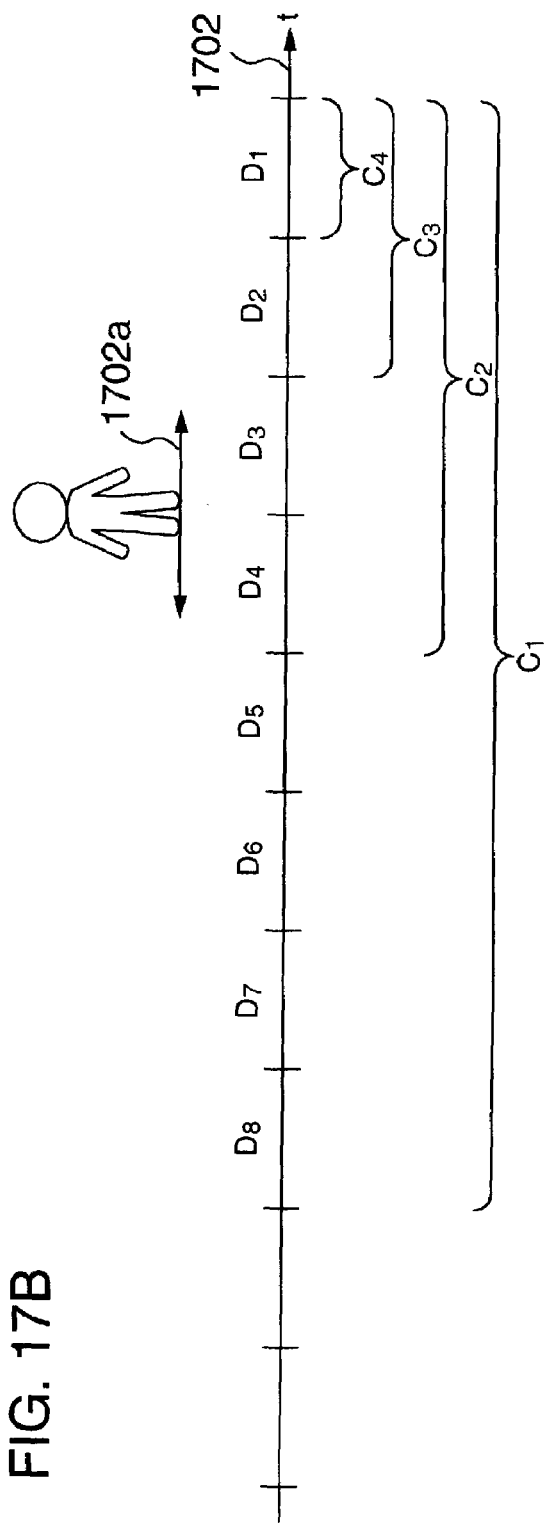
Figure 17C:
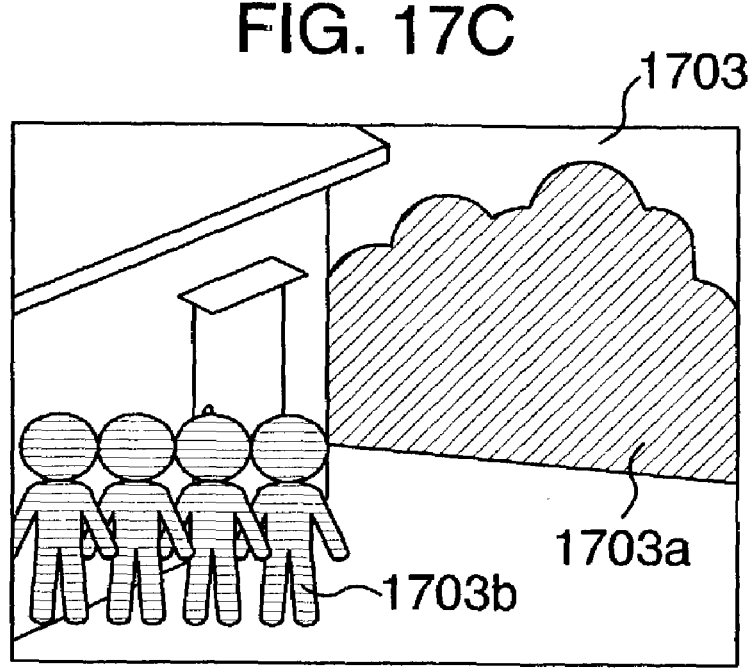
Figure 17D:
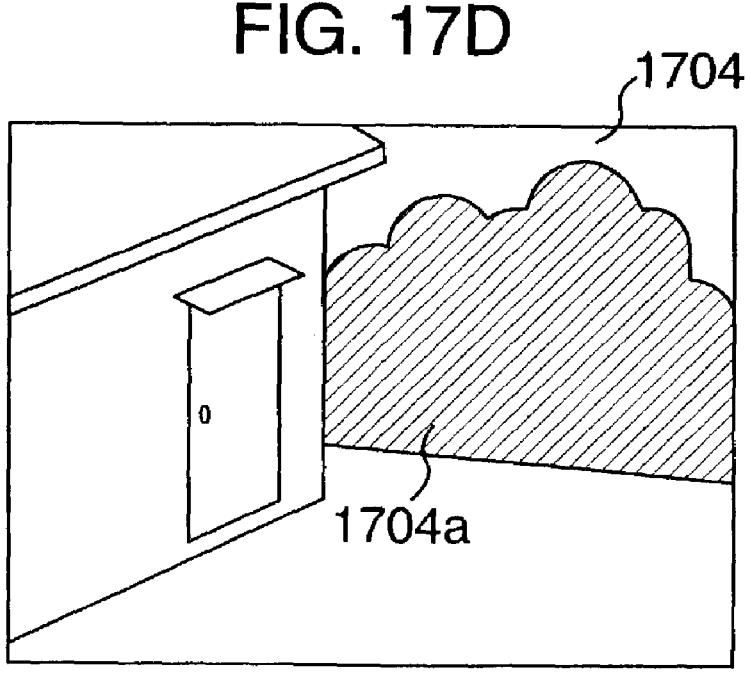

FIGS. 17A to 17D are diagrams for explaining a process for obtaining a masking candidate image from a divisional accumulated binary image, with FIG. 17A showing a first example of the process, FIG. 17B showing a second example of the process and FIGS. 17C and 17D showing examples of a masking candidate image obtained through the respective processes.

According to the present embodiment 8, in the divisional accumulated binary image logical sum step 190, predetermined divided accumulated binary images are selected from a plurality of divided accumulated binary images (to be described later) and the logical sum of the selected images is calculated. The divided accumulated binary images and a method of selecting the predetermined divided accumulated binary images from the plurality of divided accumulated binary images will be described with reference to FIGS. 17A and 17B.

FIGS. 17A and 17B show time sections for calculation of divided accumulated binary images in relation to lapse of time and a selection (combination) of divided accumulated binary images representing masking candidates. In the figures, $D_i$ (i=1 to 8) represents time sections (for example, at intervals of 10 minutes) for calculation of divided accumulated binary images and during each section, an accumulated binary image is calculated in accordance with the binary image accumulation method explained with reference to FIG. 7. The thus obtained accumulated binary images are called divided accumulated binary images. Subsequently, individual divided accumulated binary images are selected in accordance with combinations $C_i$ (i=1 to 4) and the logical sum of divided binary images is calculated in each combination. This is a masking candidate. In FIG. 17A, time sections (segments) for calculation of the individual masking candidates are combined so as to half overlap with each other such that the process of adding two consecutively obtained divided, accumulated binary images is repeated with the time segment for calculating a mask candidate shifted one time segment by one time segment. For example, a masking candidate $C_1$ can be obtained from divided accumulated binary images $D_1$ and $D_2$, a masking candidate $C_2$ can be obtained from divided accumulated binary images $D_2$ and $D_3$, a masking candidate $C_3$ can be obtained from divided accumulated binary images $D_3$ and $D_4$ and a masking candidate $C_4$ can be obtained from divided accumulated binary images $D_4$ and $D_5$. In FIG. 17B, time sections to be combined for providing a masking candidate are combined by changing the time length referenced to $D_1$, so that a masking candidate $C_1$ can be obtained from the logical sum of all divided accumulated binary images $D_1$, $D_2$, $D_3$, $D_4$, $D_5$, $D_6$, $D_7$ and $D_8$, a masking candidate $C_2$ can be obtained from the logical sum of the divided accumulated binary images $D_1$, $D_2$, $D_3$ and $D_4$, a masking candidate $C_3$ can be obtained from the logical sum of the divided accumulated binary images $D_1$ and $D_2$ and a masking candidate $C_4$ can be obtained from the divided accumulated binary image $D_1$. Putting the above combination methods aside, the time width of the time section may be variable or divided accumulated binary images may be combined together for preparation of masking candidates as a round robin or at random.

In the masking candidate switching decision step 211, the operator decides whether the masking candidate is to be switched and selects a masking candidate through a predetermined operation corresponding to the decision result. For example, the direction key E04c of operation unit E04' is depressed. Depending on the depression direction of the direction key E04c, the masking candidate can be switched. For example, depression is done to the right, the masking candidate is forwardly advanced, that is, switched from $C_i$ to $C_{i+1}$ (i=1 to 3). With $C_4$ displayed as a masking candidate (i=4), depression to the right causes $C_4$ to return to $C_1$. For example, depression is done to the left, the masking candidate is backwardly advanced, that is, switched from $C_i$ to $C_{i-1}$ (i=2 to 4). With $C_1$ displayed as a masking candidate (i=1), depression to the left causes $C_1$ to return to $C_4$.

In the predetermined time lapse decision step 115, when a predetermined time (10 minutes in the above example) has passed from accumulation of a binary image to a divided accumulated binary image (to be described later), the program branches to the divisional accumulated binary image shift step 116 but when the predetermined time has not elapsed, the program branches to the divisional accumulated binary image update step 117. The divided accumulated binary image is stored in the image memory E05e and is a division of the accumulated binary image explained in the embodiment 7 by a plurality of time intervals (time sections). In the divisional accumulated binary image shift step 116, the oldest one of the divided accumulated binary images stored in the image memory E05e is discarded and the secondly old divided accumulated binary image is copied to an image memory in which the oldest divided accumulated binary image has been stored till then. In the above example, $D_8$ is discarded and $D_i$ is copied to $D_{i+1}$ (i=1 to 7). Such a work as above is carried out in sequence from older to newer divided accumulated binary images and by clearing an image memory of the newest divided accumulated binary image ($D_1$), shifting of the divided accumulated binary image is carried out. In the divisional accumulated binary image update step 117, the logical sum of individual pixels of the binary image and those of the newest divided accumulated binary image ($D_1$) stored in the image memory E05e is calculated and a resulting image substitutes for the newest divided accumulated binary image ($D_1$) stored in the image memory E05e.

Effects attained by the above will be described with reference to FIGS. 17A to 17D. In FIGS. 17A and 17B, it is assumed that an intruding object of human type exists during a period 1701a or 1702a. FIG. 17C shows an example of a masking candidate $C_1$ prepared in the logical sum step 190 of divided accumulated binary images. FIG. 17D shows an example of masking candidate $C_4$ prepared in the logical sum step 190 of divided accumulated binary images. In a masking candidate image 1703 of FIG. 17C, there is displayed not only an accumulated detection region 1703a which reflects rustling of trees and grass but also a detection region 1703b accumulated during the period 1701a or 1702a in which an intruding object of human type intrudes and this masking candidate is not suited for a masking region. If this masking candidate is set as a masking region, the region in which the intruding object of human type to be originally watched exists is also included in the masking region. In a masking candidate image 1704 of FIG. 17D, only an accumulated detection region 1704a which reflects rustling of trees and grass is a masking candidate. Since this region can be obtained when the masking candidate $C_1$ is selected in FIG. 17A or the masking candidate $C_3$ or $C_4$ is selected in FIG. 17B, the operator can depress the direction key E04c of operation unit Eo4' while observing the masking candidate so as to switch the masking candidate, thereby obtaining a desired candidate.

As described above, by operating the operation unit E04', the operator can select, from the masking candidates, such a masking candidate as masking candidate image 1704 not containing a detection region of an intruding object to be detected. Accordingly, when compared to the embodiment 7 in which only one kind of accumulated binary image is set as a masking candidate, the operator can select, in the embodiment 8, the best masking candidate from masking candidates resulting from the logical sum of a plurality of divided accumulated binary images as shown in the examples of FIGS. 17A and 17b. By setting the selected best masking candidate as a masking region, a suitable masking region can be set through a decreased number of operations even when an intruder such as a human intruder exists.

Embodiment 9 of the invention will be described with reference to FIG. 18. FIG. 18 is a flowchart for explaining a processing process in the embodiment 9 of the invention.

In the embodiment 8, a masking candidate selected during setting of a masking region substitutes for the masking region but in the present embodiment 9, a masking candidate can be added to a masking region. In the present embodiment 9, the mask switching step 213 in embodiment 8 is replaced with mask adding step 213' and other steps are the same as those in the embodiment 8 and will not be described. In the mask adding step 213', a new masking candidate is added to a masking candidate stored in the image memory E05e, thereby permitting detection images occurring at different timings to be additionally set to a masking region.

Advantageously, thanks to the addition of a masking candidate according to the present embodiment 9, selection of a masking candidate $C_4$ can be added to the selection of a masking candidate $C_3$ in FIG. 17B. Accordingly, the operator can obtain a desired candidate by depressing the direction key E04c of operation unit E04' while observing a masking candidate so as to switch the masking candidate and besides can also carry out fruitful masking region setting attributable to the addition of masking candidate.

According to the above embodiments, an accumulated binary image obtained by accumulating a detection image obtained through the object detection process for a predetermined time is set as a masking candidate and in addition, a plurality of masking candidates are prepared to enable the operator to select a suitable one from the masking candidates, thereby ensuring that the masking region can be set easily and accurately.

Next, still other embodiments of the invention will be described. In an object detection method in the following embodiments, with the aim of solving the conventional problems that skillfulness is required for masking region setting and that when a masking region is set in the form of a polygon, it is very difficult to accurately designate a region where trees and grass grow, a masking region can be designated on the basis of a changed region obtained through a changing region detection process.

Namely, in the following embodiments, the operator can operate the operation unit to select a partial region of a changing region and set the partial region as a masking region so as to easily and accurately set the masking region.

Conveniently, the monitor system described with reference to FIG. 3 will be used to give a description of the embodiments of the invention to be described hereinafter.

Figure 19:
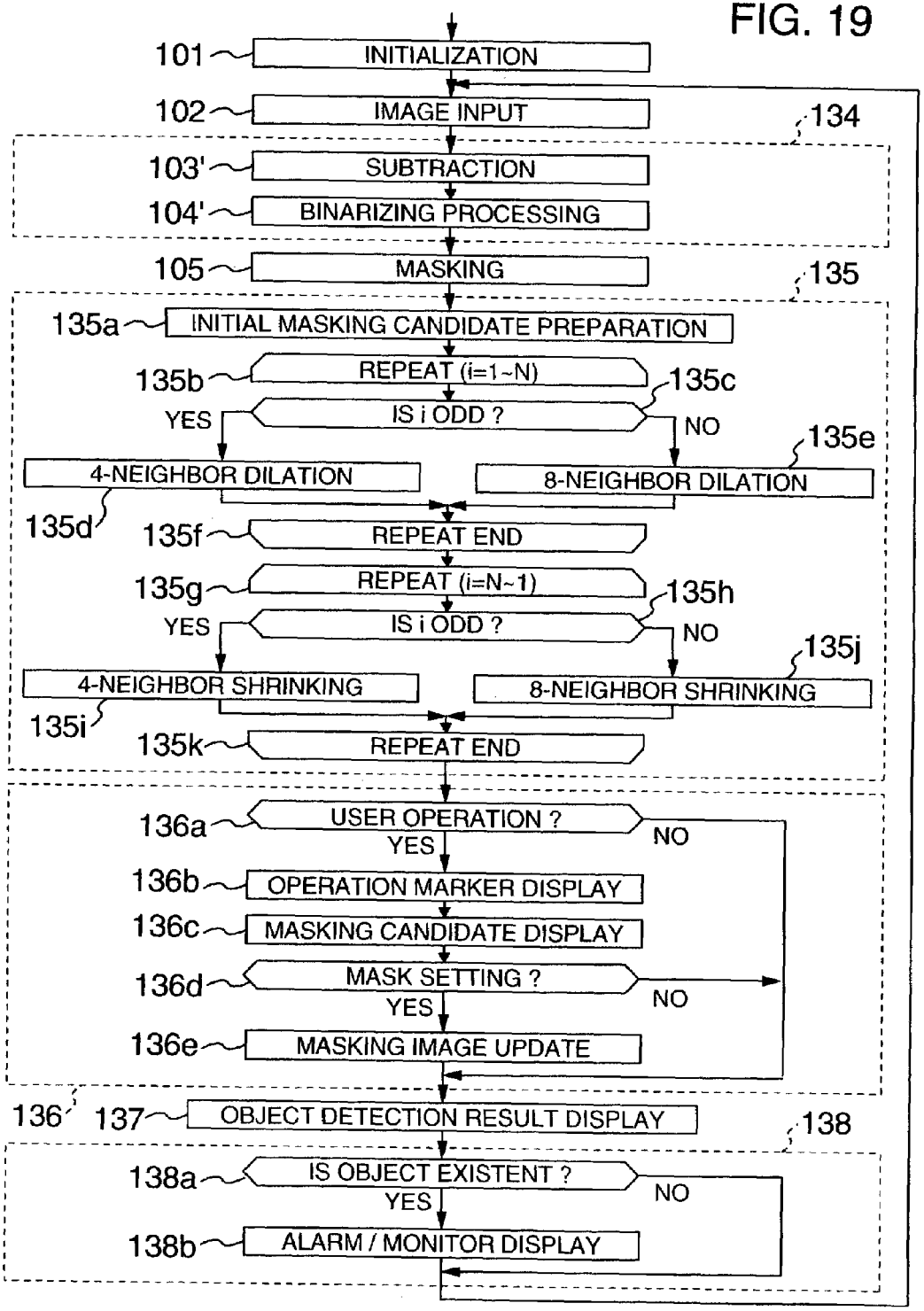
FIG. 19 is a flowchart showing a processing process according to embodiment 10 of the invention.

Embodiment 10 of the invention will be described with reference to FIG. 19. FIG. 19 is a flowchart for explaining an example of operation of a processing process in the embodiment 10 of the invention.

Firstly, in initialization step 101, initialization of an image memory for image recording held in the image memory E05e and adapted for use in an object detection process and variables held in the work memory E05j is executed.

Next, in image input step 102, an input image having, for example, a width of 320 pixels and a height of 240 pixels, where each pixel is of 8 bits, is acquired from the TV camera E01. These steps 101 and 102 have already been described in connection with FIG. 4 and other figures.

Succeeding step 134 contoured by a dotted-line rectangle is changing region detection step which includes subtraction process step 103' and binarizing processing step 104'.

Firstly, in the subtraction process step 103', subtraction is carried out between individual pixels of the input image obtained in the image input step 102 and individual pixels of a reference background image recorded in advance on the image memory E05e to provide a subtracted image.

Next, in the binarizing processing step 104', individual pixels of the subtracted image obtained in the subtraction process step 103' are binary processed so that the pixel value less than a threshold value (for example, 20) may assume "0" and the pixel value not less than the threshold value may assume "255", thus providing a binary image. The thus obtained binary image represents a changeable region of the input image.

Figure 2A:
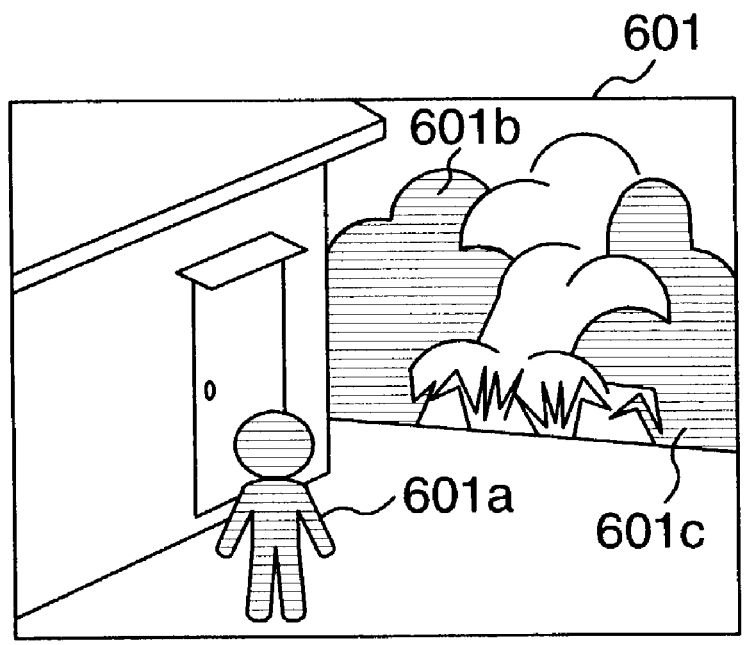
FIGS. 2A and 2B are diagrams for explaining a problem raised when the subtraction method of FIG. 1 is used.
Figure 2B:
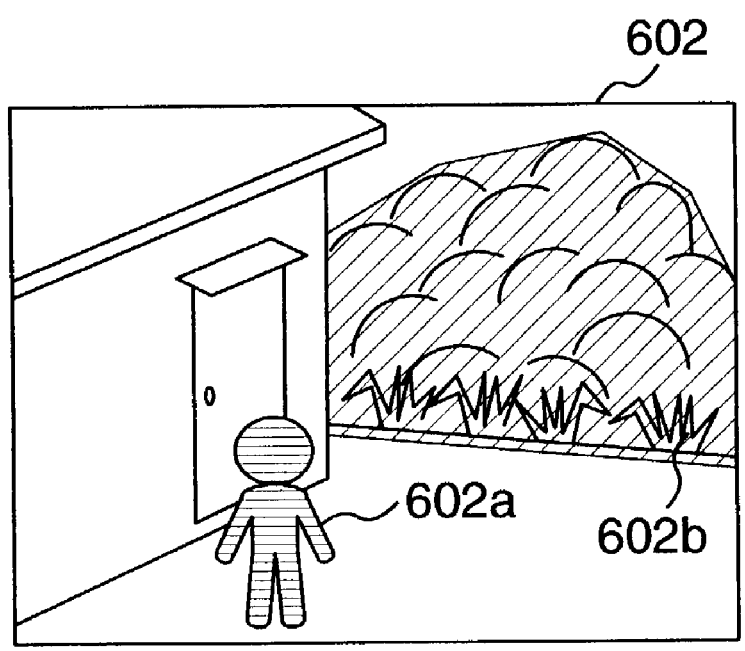

Next, in masking process step 105, a masking process as explained in connection with FIGS. 2A and 2B is carried out. In other words, the pixel value of the changing region detected in the form of a binary image is modified (masked) from "225" to "0" inside a masking region stored in image memory E05e (in the object detection apparatus, the masking region is held as an image).

In this manner, of changed regions detected as binary images, a changed region detected in a region where, for example, trees and grass grow can be deleted.

The subsequent step 135 contoured by a dotted-line rectangle is masking candidate region preparing step which includes steps 135a to 135k. Operation in each step will now be described.

In the initial masking candidate preparing step 135a, a binary image is copied to a masking candidate region stored in the image memory E05e (in the object detection apparatus, the masking candidate region is held as an image), thus completing initialization of the masking candidate region.

Subsequently, the repeat step 135b causes steps between it and the repeat end step 135f to repeat themselves predetermined times. In the present embodiment, a counter variable i held in the work memory E05j is used to cause the steps repeat themselves while increasing the variable one by one during an interval in which i changes from 1 to N (N being positive integer, for example, N=5).

In the odd number decision step 135c, the program branches to the 4-neighbor dilation step 135d when the counter variable i is odd but the program branches to the 8-neighbor dilation step 135e when the counter variable i is even.

Figure 20C:
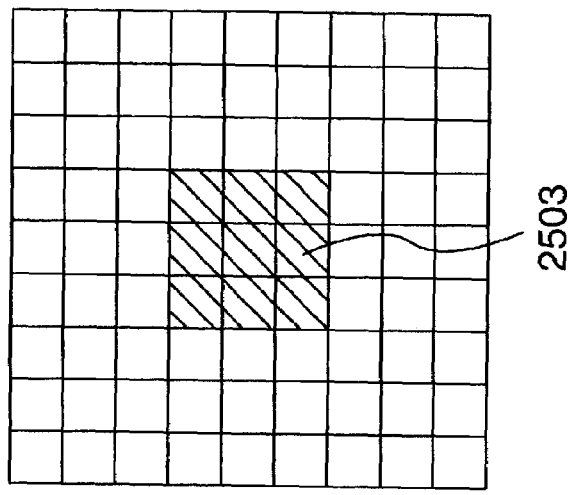
FIGS. 20A to 20C are diagrams for explaining an example of a region dilation process according to the invention.
Figure 20B:
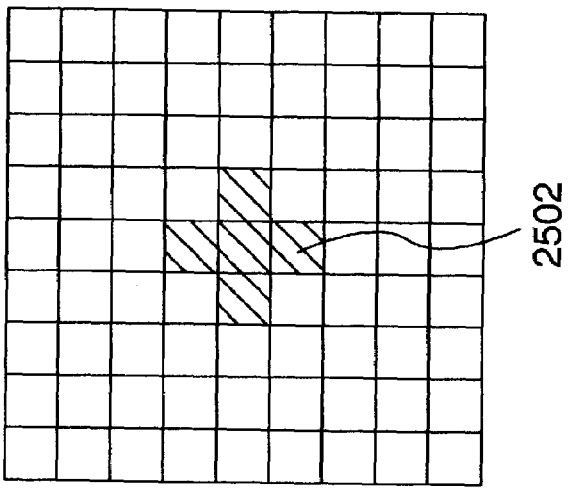
Figure 20A:
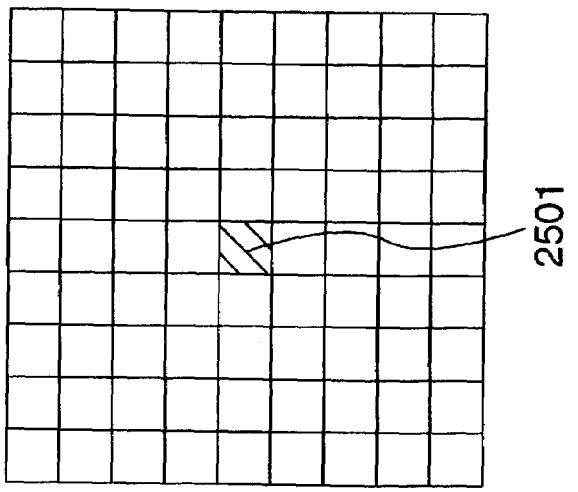

FIGS. 20A to 20C are diagrams for explaining an example of the dilation or expansion process according to the invention.

In the 4-neighbor dilation step 135d, a masking candidate region is scanned to dilate pixels of the initial masking candidate region with 4-neighbors. This process will be described with reference to FIGS. 20A and 20B. FIGS. 20A to 20C are diagrams for explaining an example of the region dilation process.

In FIGS. 20A to 20C, hatched pixel or pixels represent a masking candidate region (pixels assuming a value of "255"). This stands good for FIGS. 21A to 25 to be described later.

FIG. 20A shows a masking candidate region before the region dilation process. Here, for convenience of explanation, the masking candidate region before the region dilation process is supposed to have herein only one pixel.

In the 4-neighbor dilation process, upper, lower, left and right pixels (4-neighbor pixels) around the pixel having "225" value (region 2501 in FIG. 20A) are processed to have "225" value. Accordingly, the initial masking candidate region indicated in FIG. 20A (region 2501) is changed to a masking candidate region in FIG. 20B (region 2502) through the 4-neighbor dilation process.

In the 8-neighbor dilation step 135e, the masking candidate region inclusive of an initial masking region is scanned so as to dilate pixels of the initial masking region to 8-neighbors. This process will be described with reference to FIGS. 20A and 20C.

In the 8-neighbor dilation process, upper, lower, left, right, left-upper, right-upper, left-lower and right-lower pixels (8-neighbor pixels) around the pixel having "225" value (region 2501) are processed to have "225" value. Accordingly, the masking candidate region indicated in FIG. 20A (region 2501) is changed to a masking candidate region (region 2503) in FIG. 20C.

In the repeat end step 135f, it is decided whether the counter variable i comes to a predetermined value N and when i=N stands, the program branches to the subsequent repeat step 105g but when i<N stands, i is increased by one and the odd number decision step 135c repeats itself.

Figure 21C:
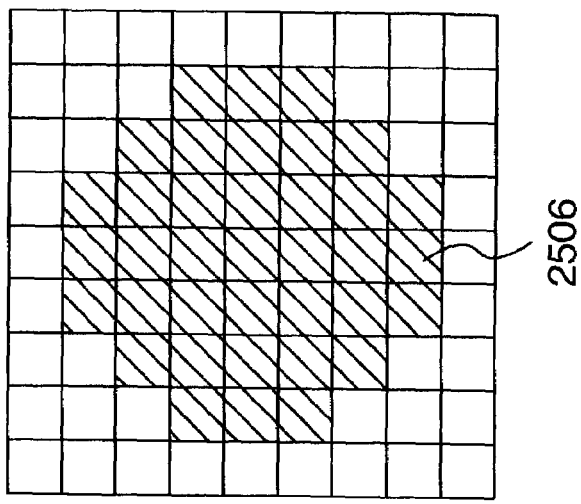
FIGS. 21A to 21C are diagrams for explaining another example of the region dilation process according to the invention.
Figure 21B:
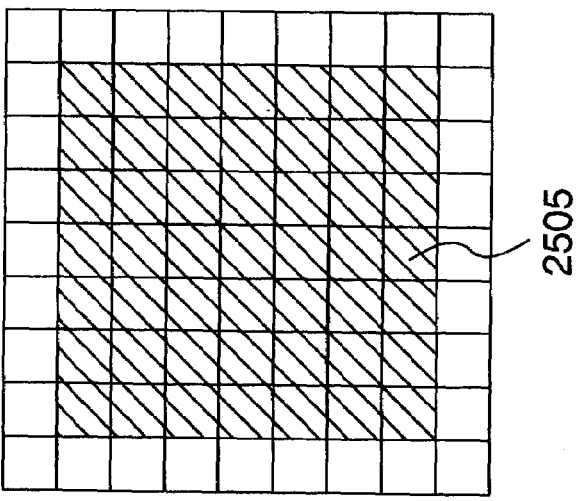
Figure 21A:
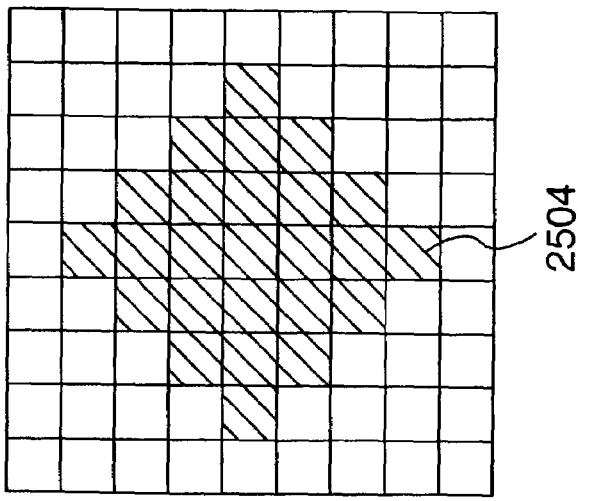

Here, if only the 4-neighbor dilation step 135d is executed plural times, the masking candidate region 2501 in FIG. 20A is changed to a rhombic region such as a masking candidate region 2504 of FIG. 21A (FIG. 21A showing an example when N=3). In this case, the masking candidate region 2501 before the region dilation process can be dilated by 3 pixels in upper, lower, left and right directions but can be dilated by only one pixel (more precisely, $2^{1/2}$ pixels) in the oblique direction.

On the other hand, if only the 8-neighbor dilation step 135e is executed plural times, the masking candidate region 2501 in FIG. 20A is changed to a rectangular region such as a masking candidate region 2505 of FIG. 21B (like FIG. 21A, an example for N=3). In this case, the masking candidate region 2501 before the region dilation process can be dilated by 3 pixels in the upper, lower, left and right directions but can be dilated by even 4 pixels (precisely, $3 \times 2^{1/2}$ pixels) in the oblique direction.

Then, the 4-neighbor dilation step 135d and the 8-neighbor dilation step 135e are executed alternately in order that the difference between the ratio of dilations in the upper, lower, left and right directions and the ratio of dilation in the oblique direction can be decreased as shown at a masking candidate region 2506 in FIG. 21C (three pixels in the upper, lower, left and right directions and about three pixels (precisely $2 \times 2^{1/2}$ pixels).

Next, the repeat step 135g causes steps between it and the repeat end step 135k to repeat themselves several times. Like the repeat step 135b to repeat the end step 135f, these steps are carried out repeatedly while using the counter variable i held in the work memory E05j such that i can be decreased one by one between N and 1. In the odd number decision step 135h, when the counter variable i is odd, the program branches to the 4-neighbor shrinking step 135i but when the counter variable i is even, the program branches to the 8-neighbor shrinking step 135j.

Through the aforementioned 4-neighbor dilation step 135d and 8-neighbor dilation step 135e, the area of the masking candidate region increases but through the 4-neighbor shrinking step 135i and 8-neighbor shrinking step 135j, the area of the masking candidate region decreases.

In the 4-neighbor shrinking step 135i, the masking candidate region inclusive of an initial masking candidate region is scanned to shrink pixels of the initial masking candidate region to 4-neighbors. This process will be described with reference to FIGS. 22A and 22B.

Figure 22C:
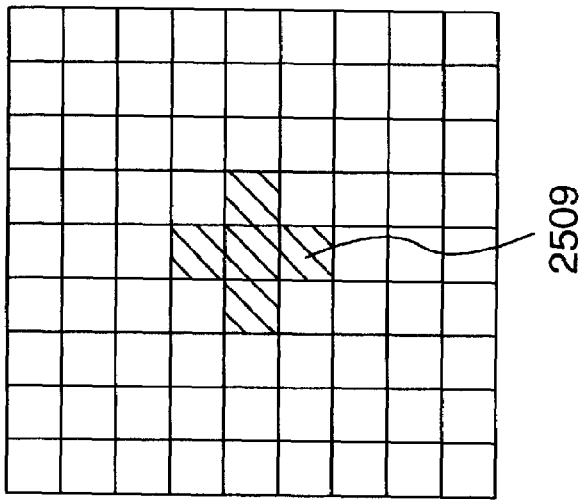
FIGS. 22A to 22C are diagrams for explaining an example of a region shrinking process according to the invention.
Figure 22B:
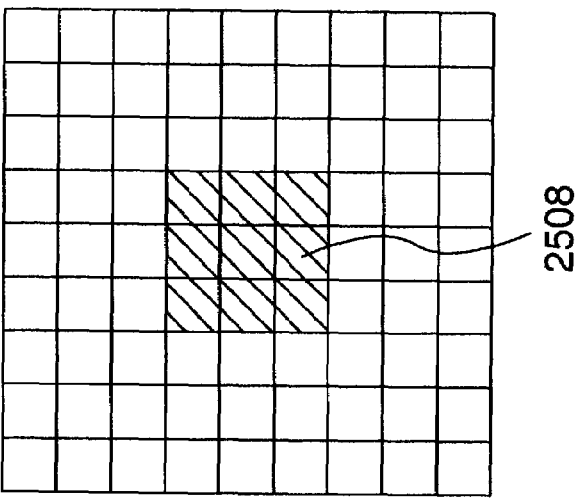
Figure 22A:
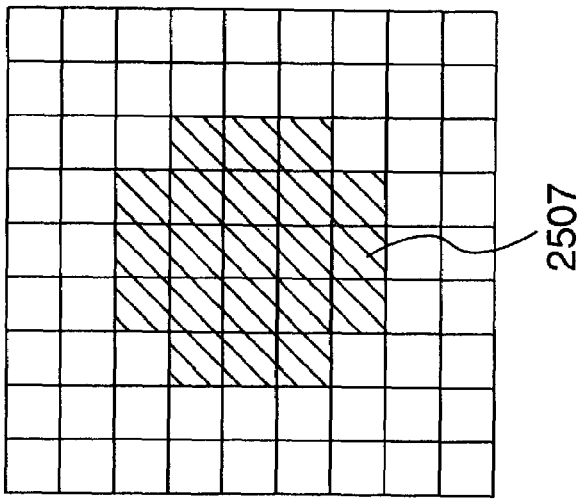

Referring to FIGS. 22A and 22B, the 4-neighbor shrinking process is a process in which when, of pixels having "255" value (region 2507), any one of upper, lower, left and right pixels (4-neighbor pixels) has "0" value, the 4-neighbor pixels are caused to have "0" value.

Accordingly, the masking candidate region (region 2507) indicated in FIG. 22A is resulted in a masking candidate region (region 2508) as shown in FIG. 22B through the 4-neighbor shrinking process.

Meanwhile, in the 8-neighbor shrinking step 135*j*, the masking candidate region inclusive of an initial masking candidate region is scanned to shrink pixels of the initial masking candidate region to 8-neighbors. This process will be described with reference to FIGS. 22A and 22C. When, of pixels having "255" value (region 2507), any one of upper, lower, left, right, left-upper, right-upper, left-lower and right-lower pixels (8-neighbor pixels) has "0" value, the 8-neighbors are caused to have "0" value pursuant to the 8-neighbor shrinking process. Accordingly, the initial masking candidate region (region 2507) indicated in FIG. 22A is resulted in a masking candidate region (region 2509) as shown in FIG. 22C through the 8-neighbor shrinking process.

Then, the 4-neighbor dilation step 135*d* and 8-neighbor dilation step 135*e* are executed predetermined times (from step 135*b* to step 135*f*) and thereafter the 4-neighbor shrinking step 135*i* and 8-neighbor shrinking step 135*j* are executed identical times (from step 135*g* to step 135*k*) to attain effects as will be described with reference to FIGS. 23, 24 and 25.

Figure 23:
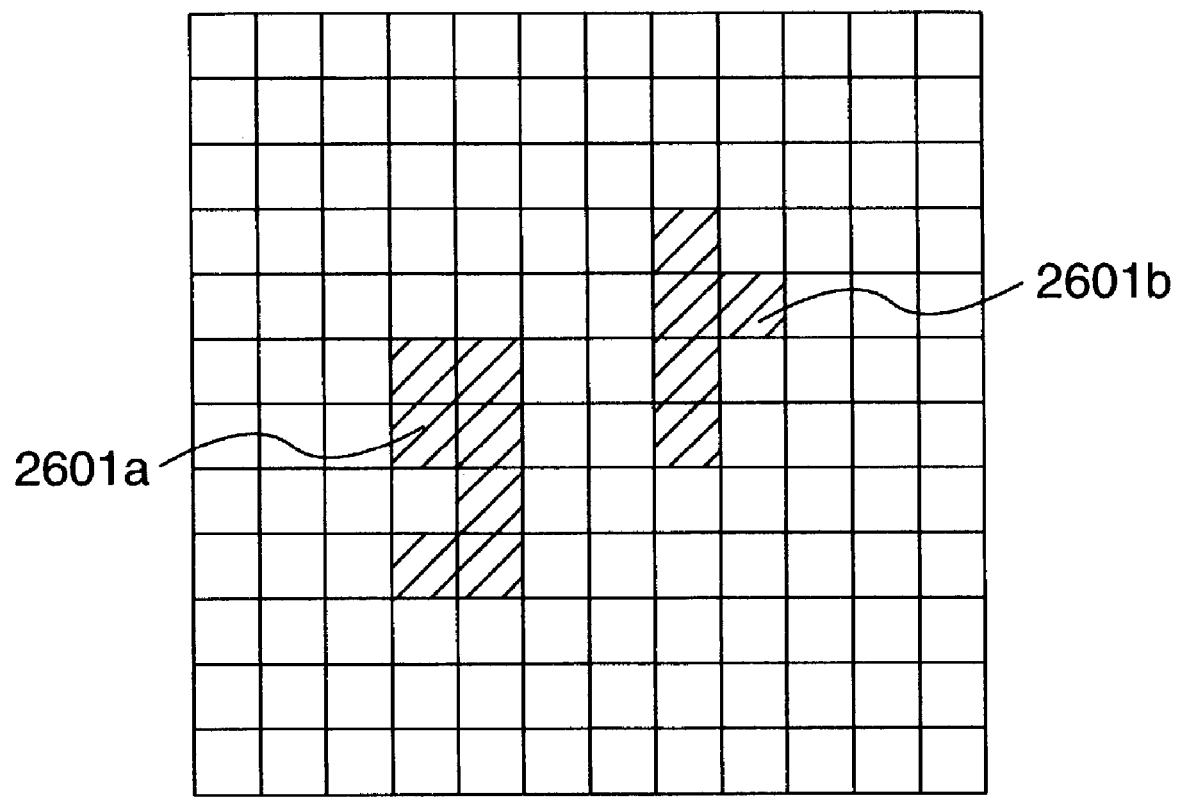
FIG. 23 is a diagram for explaining a masking candidate region according to the invention.
Figure 24:
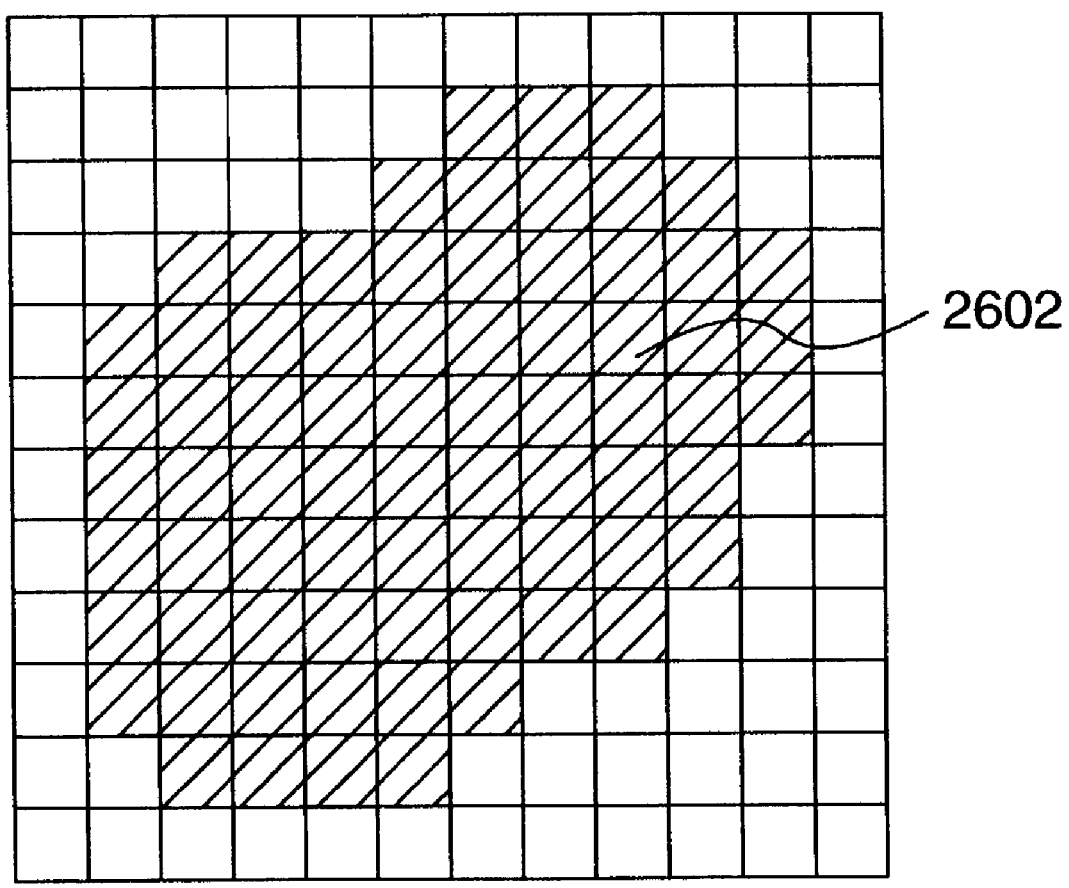
FIG. 24 is a diagram for explaining a result of the region dilation process applied to the masking candidate region according to the invention.

FIG. 23 shows a masking candidate region after execution of the initial masking candidate preparation step 135*a*. In this phase, the masking candidate region is divided into two partial regions 2601*a* and 2601*b*. When execution of a region dilation process (from step 135*b* to step 135*f*) with N=2 is applied to the masking candidate region, a masking candidate region 2602 as shown in FIG. 24 can be provided.

Figure 25:
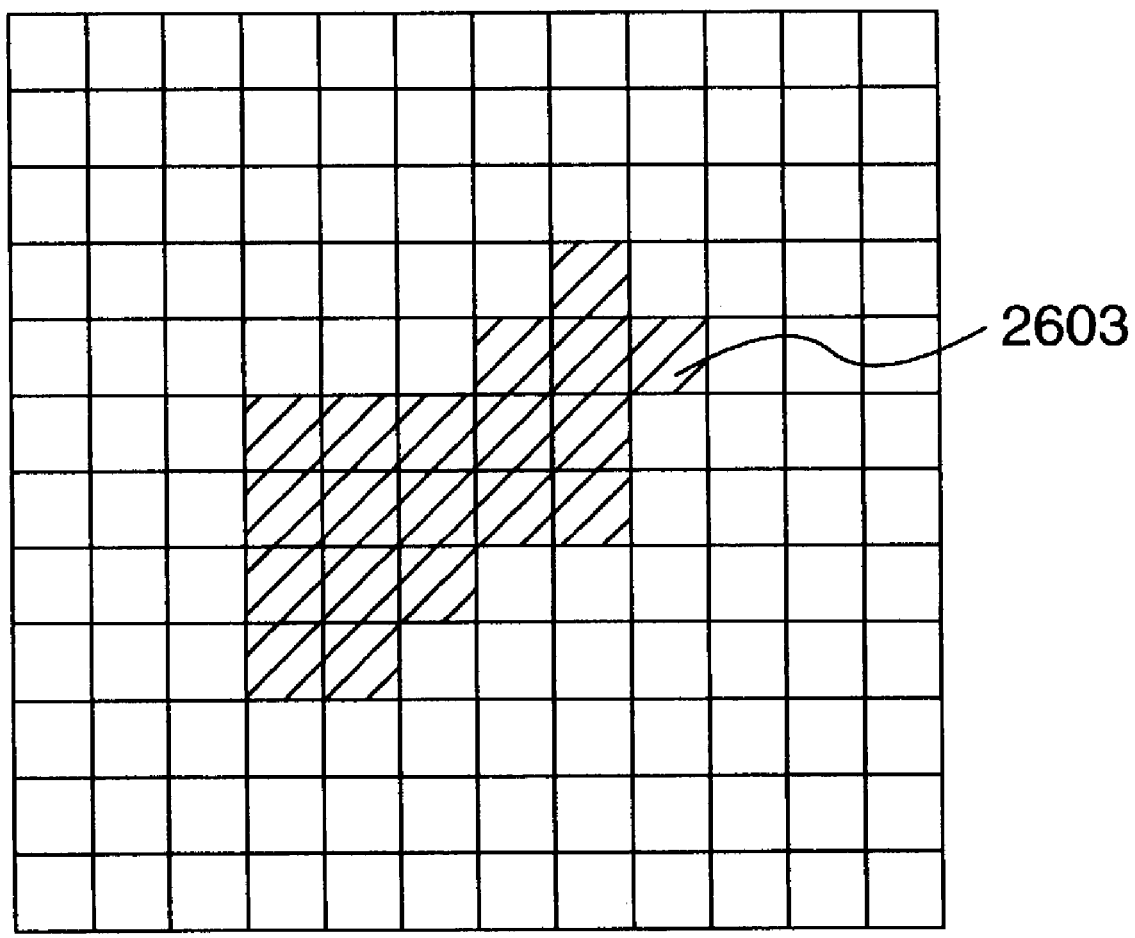
FIG. 25 is a diagram for explaining a result of the region dilation process and region shrinking process both applied to the masking candidate region according to the invention.

Subsequently, with the region shrinking process (from step 135*g* to 135*k*) executed, there results a masking candidate region 2603 as shown in FIG. 25. Accordingly, the split partial regions shown in FIG. 23 can be linked together through the region dilation process and the region shrinking process and can be handled as a single region. The distance between the linkable partial regions is 2N pixels.

The aforementioned region dilation process and region shrinking process have hitherto been utilized widely in the field of image processing and are explained in "Digital Picture Processing" by Azriel Rosenfeld et al, Academic Press, 1976, pp. 362–367, for instance.

Next, step 136 contoured by a dotted-line rectangle is a mask setting step which includes steps 136*a* to 136*e*. Operation of each step will be described with reference to FIGS. 5A to 5D.

In the user operation decision step 136*a*, when the operator operates the operation unit E04, the program branches to the operation marker display step shifting step 136*a* but with the operation unit not operated, the program branches to object detection result display step 137.

In the operation marker display step 136*b*, an operation marker is displayed on the output monitor E06 through the image output I/F E05*f*. For example, the operation marker may take the form of an arrow 701*a* as shown in FIG. 5A or may take any form capable of identifying the position of the operation marker, for example, a crucial form, a spot form or a rectangular form.

In accordance with an operation of operation unit E04 by the operator, the operation marker moves in upper, lower, left, right and oblique directions.

Next, in the masking candidate region display step 136*c*, a masking candidate region prepared in the masking candidate preparation step 135 is displayed on the output monitor E06 through the image output I/F E05*f*. For example, as shown in FIG. 5A, the contents to be displayed may be a masking candidate region (as represented by partial regions 701*c* and 701*d* in FIG. 5A) which is superimposed on an image of image-pickup device E01 obtained through the image input I/F E05*a*.

In the mask setting operation decision step 136*d*, the program branches to the masking image update step 136*e* when the operator performs a mask setting operation by operating the operation unit E04 but the program branches to the object detection result display step 137 when the operator does not perform any mask setting operation. For example, the mask setting operation can be done when the operator depresses the first button E04*a* of operation unit E04.

In the subsequent masking image update step 136*e*, the masking image (masking region) is updated. Updating can be accomplished by calculating the logical sum of individual pixels of the present masking image stored in the image memory E05*e* and those of a partial region of masking candidate image existing at a position designated by the operation marker and substituting a resulting new masking image for the masking image stored in the image memory E05*e*.

This procedure will be described again with reference to FIGS. 5A to 5D used previously.

FIGS. 5A to 5D are diagrams for explaining how the operation marker, the region of detection object and the masking region change through time points T0 to T3.

In FIGS. 5A to 5D, images 701, 702, 703 and 704 represent images displayed on the output monitor E06 and arrows 701*a*, 702*a*, 703*a* and 704*a* represent operation markers displayed on the output monitor E06 at time points T0, T1, T2 and T3, respectively.

It is to be noted that in display in each figure, the masking region and masking candidate region are superimposed on the input image.

In FIG. 5A, the regions 701*c* and 701*d* represent masking candidate regions. In this example, any masking region is not set. As a result, the regions 701*c* and 701*d* in which trees and grass rustle are detected as a detection object. Then, when the operation marker 701*a* is operated to perform a mask setting operation within a masking candidate region 701*c* (for example, by depressing the first button E04*a* of operation unit E04), the masking candidate region 701*c* is set as a masking region.

In FIG. 5B, the region 702*b* represents a masked region and the region 702*c* represents a region for object detection. Through the mask setting operation at time point T0, the masking candidate region 701*c* in FIG. 5A is set as the masking region 702*b*. Then, when the operation marker 702*a* is further operated to perform a mask setting operation within a masking candidate region 702*c*, the masking candidate region 702*c* is (additionally) set as a masking region.

Furthermore, in FIG. 5C, the region 703*b* represents a masked region and the region 703*c* represents a region for object detection. Through the mask setting operation at time points T0 and T1, the masking candidate regions 701*c* and 702*c* are set as the masking region 703*b*.

Then, when the operation marker 703*a* is further operated to perform a mask setting operation within a masking candidate region 703*c*, the masking candidate region 703*c* is (additionally) set as a masking region.

Further, in FIG. 5D, a region 704*b* represents a masking region. Through the mask setting operations at time points T0, T1 and T2, the masking candidate regions 701*c*, 702*c* and 703*c* are so merged as to be set as the masking region 704*b*.

As described above, through the three total mask setting operations at time points T0, T1 and T2, the masking region 704*b* as shown in FIG. 5D (precisely including a region where trees and grass grow). The number of mask setting operations is determined depending on how many regions each having a cluster of pixels of "255" value exist in a masking candidate region.

In the present embodiment, in the masking candidate region preparation step 135, the region dilation process and the region shrinking process are executed and therefore, even when a plurality of clusters each having "255" value exist in a masking candidate region, neighboring regions of them can be linked together. Accordingly, the number of mask setting operations can be decreased.

Next, in the object detection result display step 137, a binary image, for instance, is displayed on the output monitor E06 through the image output I/F E05*f*.

Next, step 138 contoured by a dotted-line rectangle is object detection step which includes object existence decision step 138*a* and alarm monitor display step 138*b*.

In the object existence decision step 138*a*, a cluster of "255" values is detected through, for example, the labeling method, from a changed region obtained through the binarizing processing step 104' and masking step 105 to decide whether an object exits. In the presence of an object, the program branches to the alarm/monitor output step 138*b* but in the absence of any object, the program returns to the image input step 102.

In the alarm/monitor step 138*b*, an image of the detected object is displayed on, for example, the output monitor E06 or the alarm lamp E07 is turned on to notify that an intruding object exists.

In the manner as above, an object existing in the image-pickup view field can be detected while applying the masking process to an object other than the object to be detected, such as trees and grass, and further, through an operation by the operator, a masking region can be set through a decreased number of operations on the basis of detected changing regions.

According to the above embodiments, a masking region can be designated on the basis of a detection object region obtained through the object detection process. Namely, in the present embodiment, the operator operates the operation unit to select a detection object region and sets the selected region as a masking region, thus ensuring that the masking region can be set easily and accurately.

Next, still further embodiments of the invention will be described.

In an object detection method according to the following embodiments, to solve the conventional problems that skillfulness is required for masking region setting and that when the masking region is set in the form of a polygon, accurate designation of a region where trees and grass grow is very difficult to achieve, a detection object region obtained through the object detection process is accumulated for a period designated through an operation by the operator to prepare an accumulated detection object region and the thus prepared accumulated region is set as a masking region.

In other words, the operator operates the operation unit to set an accumulated detection object region as a masking region only when an erroneous detection takes place, with the result that the masking region can be set easily and accurately.

A description of the embodiments to be described below will be given by using the hardware construction of the object detection apparatus explained in connection with the previous FIG. 14.

Figure 26:
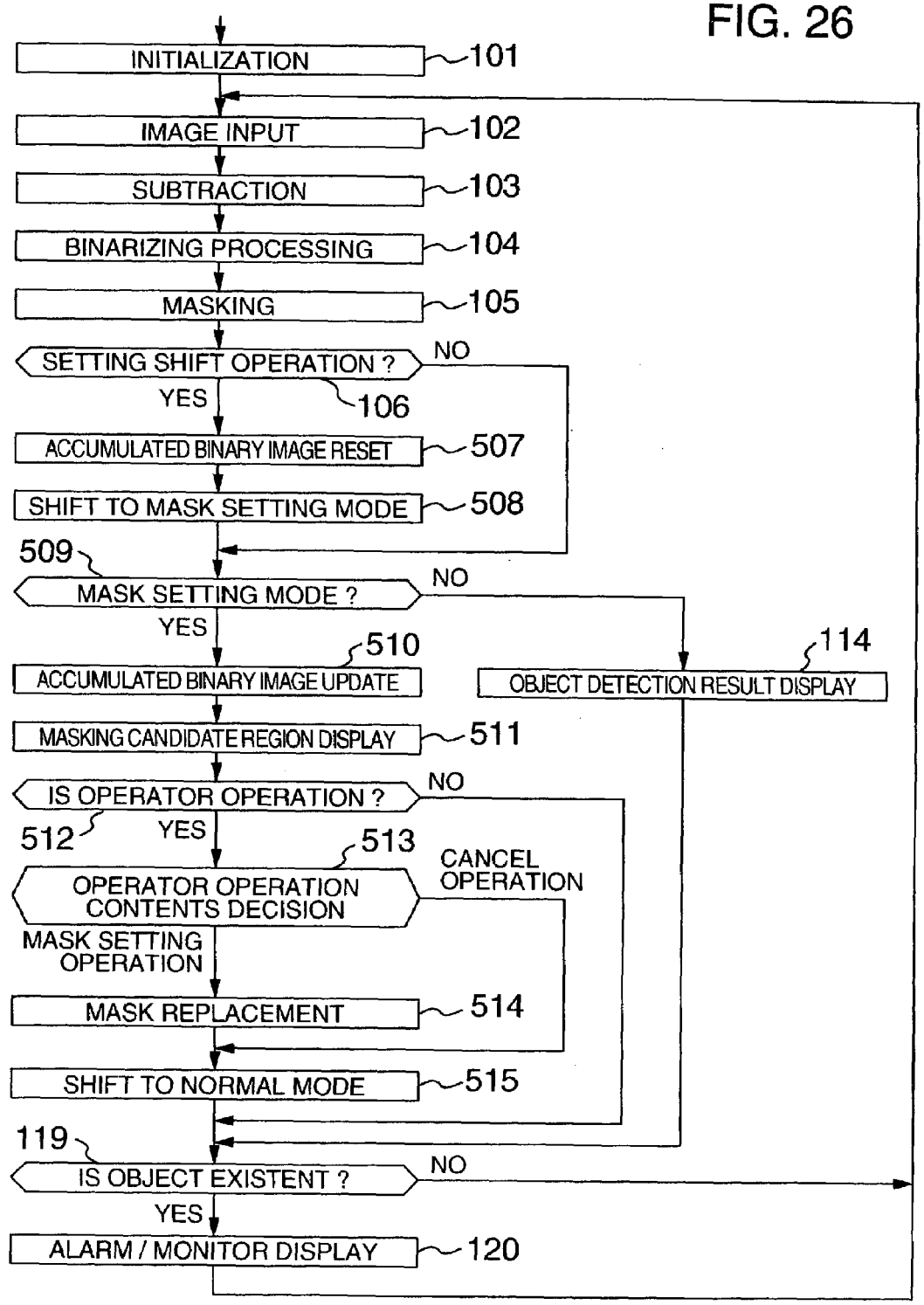
FIG. 26 is a flowchart for explaining a process according to embodiment 11 of the invention.

Embodiment 11 of the invention will be described with reference to FIG. 26. FIG. 26 is a flowchart for explaining a processing process in the embodiment 12.

In the present embodiment, an erroneous detection is accumulated within a designated period so as to be set as a masking candidate through a predetermined operation by the operator and the masking candidate is set as a masking region through a predetermined operation.

Steps 101 to 105 are the same as those already described in connection with other embodiments and will be described briefly.

In the steps 102 to 105 subsequent to the initialization step 101, a process for intruding object detection based on the subtraction method explained with reference to FIG. 1 is carried out.

Firstly, in the image input step 102, an input image S01 is acquired from the camera E01.

In the subtraction process step 103, a subtracted image S03 is obtained.

Subsequently, in the binarizing processing step 104, a binary image S04 is obtained from the subtracted image S03 obtained in the subtraction process step 103.

In the masking step 105, a masking process as explained in connection with FIG. 2B is carried out.

In the masking step 105, the pixel value of an object detected as the binary image S04 is modified (masked) from "255" to "0" within a masking region stored in the image memory E05*e* (in the object detection apparatus, the masking region is held as an image).

In this manner, of objects detected in the form of the binary image S04, an object detected in a region where, for example, trees and grass grow can be deleted. Next, in setting shift operation decision step 106, when the operator operates the operation input unit E04' to shift the processing mode to the mask setting mode, the program branches to accumulated binary image reset step 507 but when shifting to the mask setting mode is not done, the program branches to the masking mode decision step 508.

Shifting to the mask setting mode can be done by, for example, depressing the first button E04*a*' of operation input unit E04'.

In the accumulated binary image reset step 507, the accumulated binary image stored in the image memory E05*e* is cleared. By resetting the accumulated binary image in this manner, a detection object region can be accumulated newly to an accumulated binary image after shifting to the mask setting mode has been completed.

Next, in the mask setting mode shift step 508, the processing mode is set to the mask setting mode. Subsequently, in mask setting mode decision step 509, when the processing mode managed by a processing mode variable in the work memory E05*j* is the mask setting mode, the program branches to accumulated binary image update step 510 but when the processing mode is not the mask setting mode, the program branches to object detection result display step 114.

In the accumulated binary image update step 510, the logical sum of individual pixels of the binary image obtained in the binarizing processing step 104 and those of the accumulated binary image stored in the image memory E05*e* is calculated and a calculation result substitutes for the accumulated binary image stored in the image memory E05*e*.

In this manner, detection object regions detected successively are recorded.

In masking candidate display step 511, the accumulated binary image is displayed as a masking candidate on the output monitor E06 through the image output I/F E05*f*.

In a method of displaying the masking candidate, a masking candidate portion is, for example, superimposed on the present image so as to be displayed semi-transparently with a view to making the comparative study of the present input image and the masking candidate portion easy.

The operator watches the displayed masking candidate to decide whether updating of the accumulated binary image is to be continued to spread the region of masking candidate, whether the present masking candidate is to be set as a masking region or whether setting of the masking region is to be canceled.

Next, in operator operation presence/absence decision step 512, when an operation by the operator proceeds, the program branches to operator operation contents decision step 513 but in the absence of any operator operation, the program branches to object existence decision step 119 to further continue updating of the accumulated binary image.

In the operator operation contents decision step 513, when the masking candidate is set as a masking region in accordance with the contents of operation of the operation input unit E04' by the operator, the program branches to mask replacing step 514 but when setting of the masking region is canceled, the program branches to shift to normal mode step 515. The operator operation is done by depressing, for example, the first button E04a' of operation input unit E04' when the masking candidate is set as a masking region and by depressing, for example, the second button E04b' of operation input unit E04' when setting of the masking region is canceled.

In the mask replacing step 514, the masking region stored in the image memory E05e is replaced with the masking candidate to provide a new masking region.

Then, in the shift to normal mode step 515, the processing mode is set to the normal mode.

In the object detection result display step 114, a masked binary image, for instance, is displayed on the output monitor E06 through the image output I/F E506f.

Next, in the object existence decision step 119, a cluster of "255" values S09 is detected, through the labeling method, for instance, from the masked binary image obtained through the binarizing processing step 104 and masking step 105 to decide whether an object exists. In the presence of an object, the program branches to alarm/monitor output step 120 but in the absence of any object, the program returns to the image input step 102.

In the alarm/monitor display step 120, an image of the target object is displayed on, for example, the output monitor E06 or the alarm lamp E07 is turned on to notify that an intruding object exists. Effects of the method of accumulating the binary image will be described with reference to FIG. 28.

Figure 28:
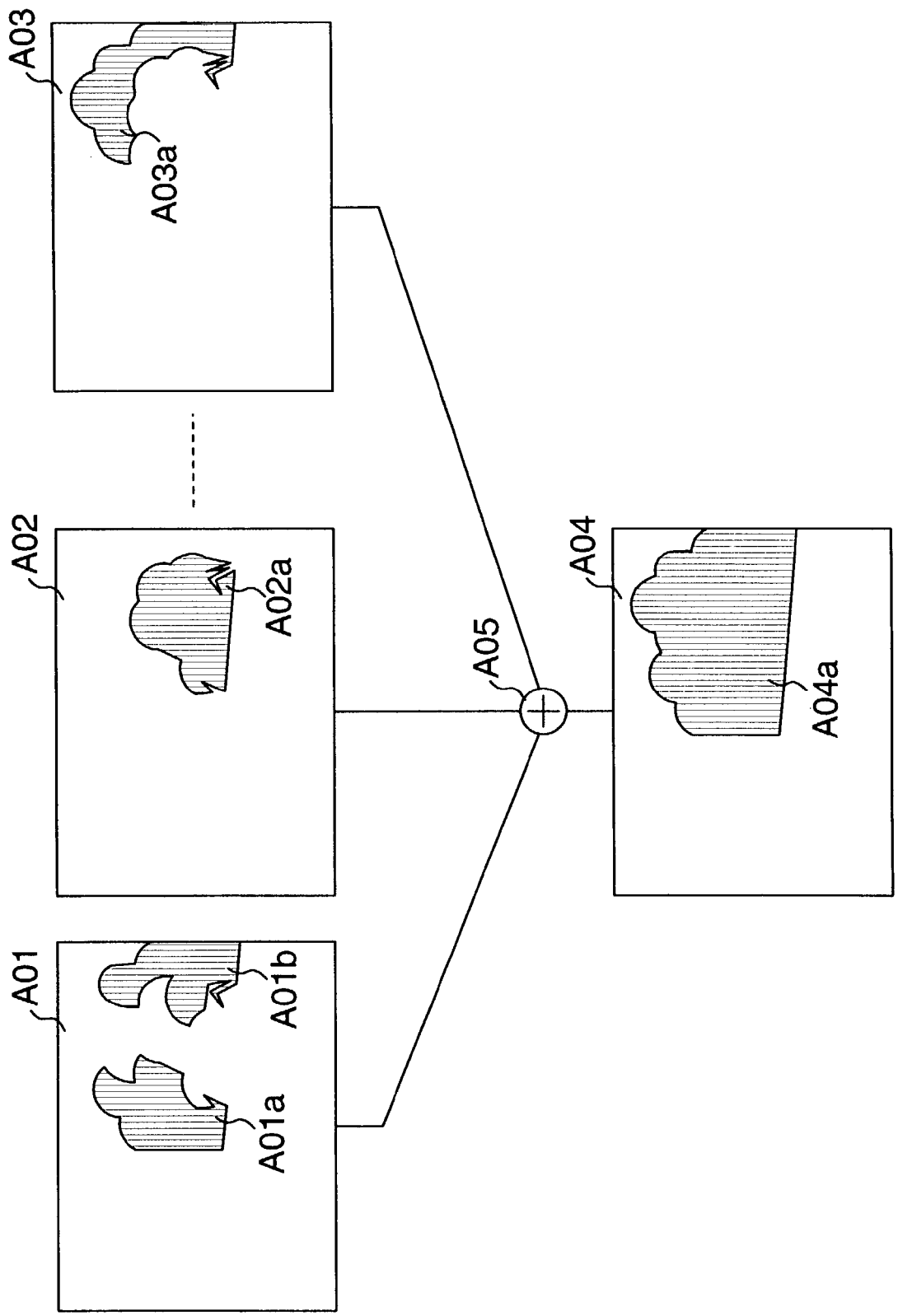
FIG. 28 is a diagram for explaining a method for preparing an accumulated binary image in the embodiments 11 and 12.
Figure 29:
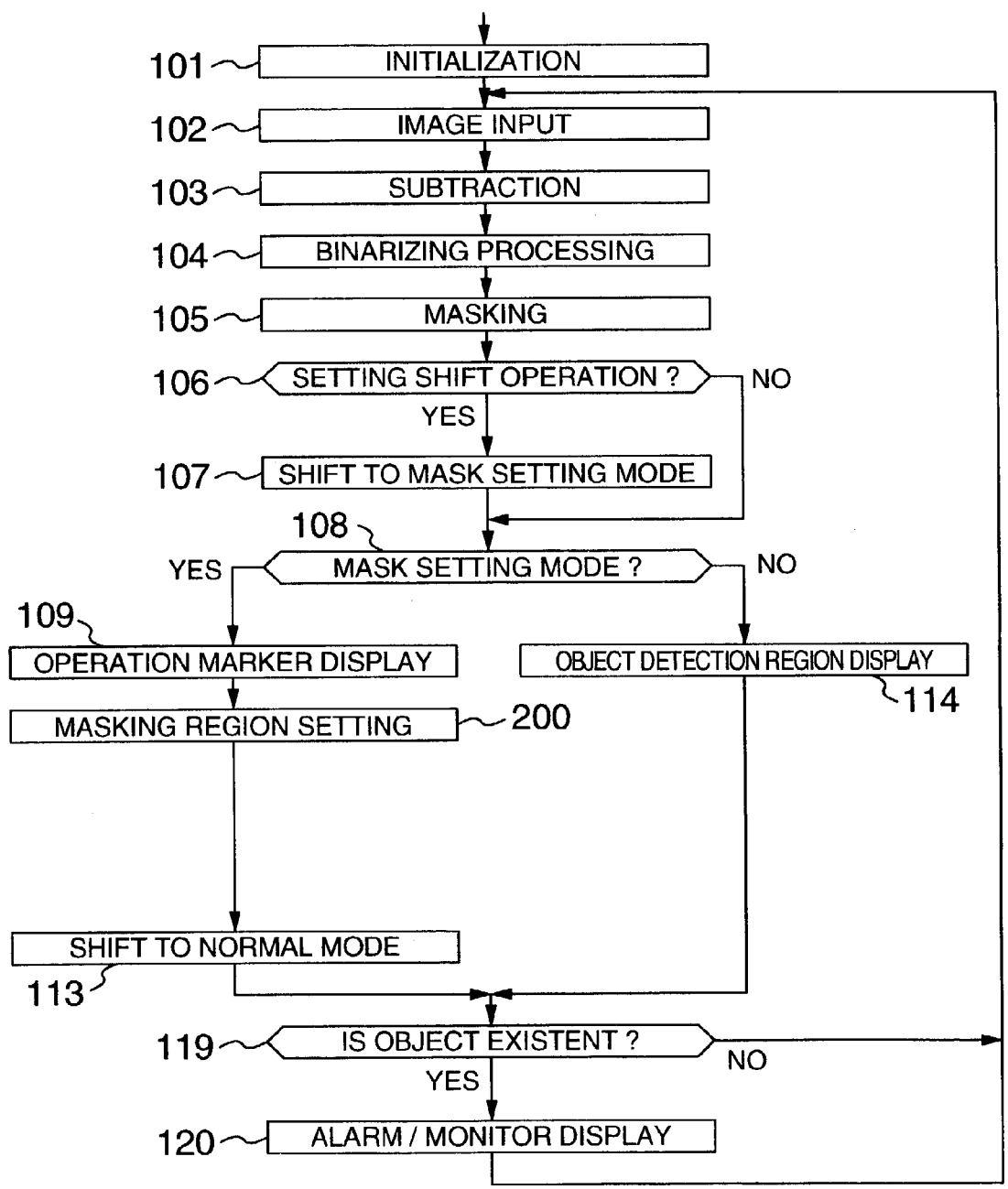
FIG. 29 is a flowchart for explaining a conventional intruding object detecting processing.

FIG. 28 shows detection object regions at time points T1, T2, . . . , Tn. Partial regions A01a, A01b, A02a, A03a of detected objects at the respective time points are calculated by using a logical sum means A05 to provide an accumulated binary image A04a. Thus, the detected regions are accumulated and a masking candidate is generated. By setting the masking candidate as a masking region, the operator can set the masking region easily.

Further, while the operator performs the predetermined first operation (shift to the mask setting mode) and second operation (setting the masking candidate as a masking region), the detected object region can be accumulated and an accumulated binary image during the accumulation can be displayed on the output monitor E06, so that the operator can performs setting of the masking region while confirming that the detected object region is accumulated sufficiently.

Since the masking region to be set in this phase is set on the basis of a region of an object detected through the subtraction method, a region where trees and grass grow can be masked more accurately and easily than in the conventional masking region setting method based on a polygon.

Figure 27:
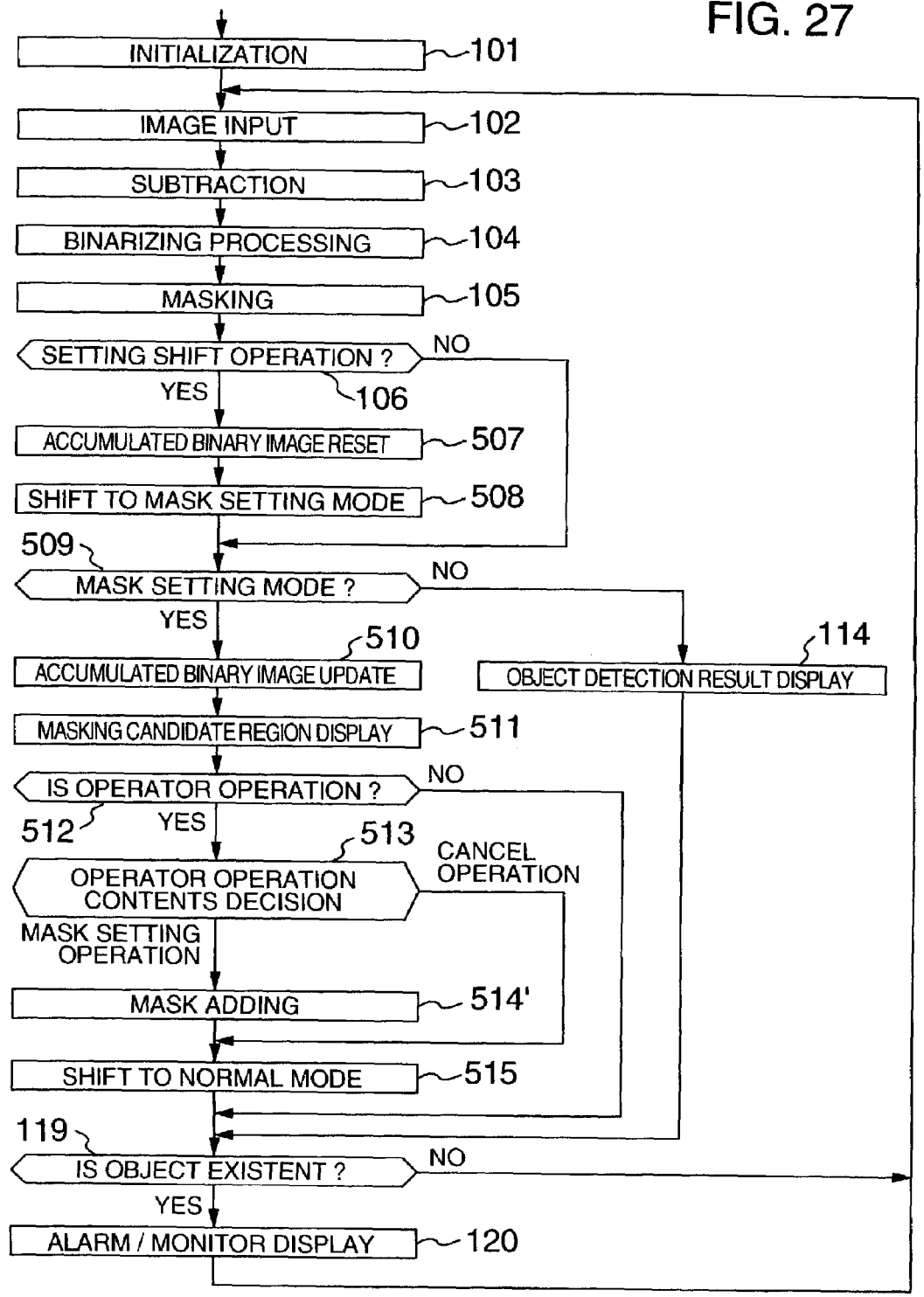
FIG. 27 is a flowchart for explaining a process according to embodiment 12 of the invention.

Embodiment 12 of the invention will be described with reference to FIG. 27. FIG. 27 is a flowchart for explaining a processing process in the embodiment 12.

In the embodiment 11 of FIG. 26, a masking candidate selected when a masking region is set substitutes for the masking region but in the present embodiment, a masking candidate can be added to a masking region.

The embodiment 12 of FIG. 27 replaces the mask replacing step 514 in the embodiment 12 of FIG. 26 with mask adding step 514' (other steps will not be described).

In the mask adding step 514', a new masking candidate is added to a masking region image stored in the image memory E05e so that erroneous detections occurring at different timings can additionally be set independently to the masking region.

For example, in order to accurately detect only an intruding object in the monitoring view field through the subtraction method, the masking process is used to prevent an erroneous detection, such as rustling of trees and grass and light reflection from a pool, from being detected. This conventional technique, however, faces problems that skillfulness is required for setting a masking region and that when a masking region is set in the form of a rectangle, accurate designation of a region where trees and grass grow is very difficult to achieve.

As described above, according to the present embodiment, an accumulated binary image obtained by accumulating a detection object region obtained through the object detection process within a period designated by an operation by the operator is set as a masking candidate and the masking candidate is set as a masking region, thereby ensuring that the operator can set the masking region easily and accurately.

It should be further understood by those skilled in the art that the foregoing description has been made on embodiments of the invention and that various changes and modifications may be made in the invention without departing form the spirit of the invention and the scope of the appended claims.

For example, the embodiment 11 may be applied to the embodiments 1 and 7 in order that the operator can designate start and end times of accumulation of an accumulated binary image.

Further, the embodiment 10 may be applied to the embodiment 1 in order that regions of objects other than an object to be detected, such as trees and grass, can automatically be linked together to merge into a smaller number of regions, thereby enabling the operator to set masking region designation through a smaller number of operations. Obviously, various combinations of the embodiments can be made in other ways, though not described specifically for avoidance of prolixity.

The invention claimed is:

1. An object detecting method for detecting a moving object, comprising the steps of:
    detecting level changes between an input image from an image-pickup apparatus and a background image recorded in a recording apparatus;
    displaying an image including at least said detected level changes on a display apparatus;

designating on the display apparatus, within said image including said level changes, an area of a predetermined level change as a masking region;
registering, as a masking image, an image obtained by designating said masking region in said recording apparatus; and
comparing an input image input from said image pickup-apparatus with said masking image to detect said moving object,
wherein said step of designating comprises the steps of:
displaying, on the display apparatus, areas that include said predetermined level changes as candidates for said masking region, and
designating, within said candidates for said masking region, at least one of said candidates for masking region which have said predetermined level change as said masking region, and
wherein said designating at least one of said candidates for masking region is performed by manipulating an operation marker on the display apparatus to select the at least one of said candidates for masking region which have said predetermined level change as said masking region.

2. An object detecting method for detecting a moving object, comprising the steps of:
detecting level changes between an input image from an image-pickup apparatus and a background image recorded in a recording apparatus;
displaying an image including at least said detected level changes on a display apparatus;
designating, within said image including said level changes, an area of a predetermined level change as a masking region;
registering, as a masking image, an image obtained by designating said masking region in said recording apparatus; and
comparing an input image input from said image pickup-apparatus with said masking image to detect said moving object,
wherein said step of detecting includes the step of detecting level changes for each of a plurality of said input images, said step of designating includes designating an area of said predetermined level change as said masking region for each of said plurality of said input images, and
wherein said masking image is an image obtained by combining images, each of which is obtained by designating a masking region for each of said plurality of said input images.

3. An object detecting method according to claim 2, wherein said step of designating includes the step of designating a different masking region for each of said plurality of said input images.

4. An object detecting method according to claim 2, wherein said masking image recorded in said recording apparatus is updated with each image obtained by designating said masking region for each of said plurality of input images.

5. An object detecting method according to claim 4, further comprising the step of:
updating said masking image registered in said recording apparatus at predetermined time intervals.

6. An object detecting method for detecting a moving object, comprising the steps of:
detecting level changes between an input image from an image-pickup apparatus and a background image recorded in a recording apparatus;
displaying an image including at least said detected level changes on a display apparatus;
designating, within said image including said level changes, an area of a predetermined level change as a masking region;
registering, as a masking image, an image obtained by designating said masking region in said recording apparatus; and
comparing an input image input from said image pickup-apparatus with said masking image to detect said moving object,
wherein the step of designating includes the step of designating the area of said predetermined level change as said masking region with an operation marker displayed on said display apparatus.

7. An object detecting method according to claim 2, wherein said plurality of said input images are input images inputted from said image-pickup apparatus at predetermined time intervals.

8. An object detecting method according to claim 7, wherein said step of designating an area of said predetermined level change as said masking region for each of said plurality of said input images includes the step of accumulating respective level changes for a predetermined accumulation time, wherein said masking image is updated based on an image obtained by combining images of said accumulated level changes.

9. An object detecting method according to claim 2, further comprising the step of:
accumulating images of detected level changes detected in said step of detecting level changes for each of a plurality of said input images in a plurality of accumulation means, respectively, and the step of updating said images of detected level changes accumulated in said plurality of accumulation means, in order of accumulation.

10. An object detecting method for detecting a moving object, comprising the steps of:
detecting level changes between an input image from an image-pickup apparatus and a background image recorded in a recording apparatus;
displaying an image including at least said detected level changes on a display apparatus;
designating, within said image including said level changes, an area of a predetermined level change as a masking region;
registering, as a masking image, an image obtained by designating said masking region in said recording apparatus;
comparing an input image input from said image pickup-apparatus with said masking image to detect said moving object; and
dividing said input image into a plurality of regions,
wherein said step of designating includes the step of designating, within said plurality of regions, a predetermined region as a masking region.

11. An object detecting method according to claim 10, further comprising the step of:
when said mask region for which said predetermined level change has not been detected over a plurality of said input images is present in said regions designated as said masking regions, releasing said masking region from said masking regions.

12. An object detecting method according to claim 10, wherein the dividing of said plurality of regions is made in either a rectangular shape or in a shape of an object displayed on said input image.

13. An object detecting method according to claim 10, further comprising the step of:
  when said masking region for which said predetermined level change has not been detected for a predetermined time period is present among said regions designated as said masking regions, releasing said masking region from said masking regions.

14. An object detecting method according to claim 1, further comprising the step of:
  displaying both said input image from said image-pickup apparatus and said candidates for masking region on said display apparatus at the same time.

15. An object detecting method according to claim 8, wherein the step of accumulating respective level changes for a predetermined accumulation time includes the step of dividing said accumulation time into a plurality of periods and forming a divided accumulated image for each divided period and the step of selecting from said plurality of accumulated images a predetermined divided image as said masking image.

16. An object detecting method according to claim 1, wherein said step of designating includes the step of dilating pixels constituting an object displayed in said candidate for masking region at a predetermined rate and the step of shrinking pixels constituting said object dilated at said predetermined rate at a predetermined rate.

17. An object detecting method according to claim 16, wherein said step of dilating pixels constituting an object at a predetermined rate includes either one of 4-neighbor dilating processing, 8-neighbor dilating processing and a combination of 4-neighbor dilating processing and 8-neighbor dilating processing and said step of shrinking said dilated pixels constituting said object dilated at a predetermined rate includes either one of 4-neighbor shrinking processing, 8-neighbor shrinking processing and a combination of 4-neighbor shrinking processing and 8-neighbor shrinking processing.

18. An object detecting apparatus for detecting a moving object, comprising:
  an image-pickup apparatus for picking-up an image of said moving object;
  a recording apparatus for recording a background image;
  a level change detecting unit for detecting level changes between an input image from said image-pickup apparatus and said background image recorded in said recording apparatus;
  a display apparatus for displaying an image including at least said level changes detected by said level change detecting unit;
  a masking region designating unit for designating a region of a predetermined level change as a masking region within said image including said level changes;
  a processing unit for registering said image obtained by designating said masking region in said recording apparatus and comparing the registered masking region with said input image inputted from said image-pickup apparatus to detect said moving object; and
  a control unit for controlling said image-pickup apparatus, said recording apparatus, said level change detecting unit and said processing unit.

19. An object processing apparatus according to claim 18, wherein said masking region designating unit has functions of displaying a region including said predetermined level changes as candidates for said masking region and designating, as a masking region, said candidate for masking region having a predetermined change.

20. An object processing apparatus according to claim 18, wherein said level change detecting unit has a function of detecting level changes for each of a plurality of said input images, said masking region designating unit has a function of designating, as a masking region, a region of said predetermined level change for each of said plurality of said input images and said masking image is a combined image obtained by combining images, each of which is obtained by designating a masking region for each of said plurality of the input images.

21. An object processing apparatus according to claim 20, said masking region designating unit has a function of designating a different masking region for each of said plurality of said input images.

22. An object processing apparatus according to claim 20, wherein said masking image recorded in said recording apparatus is updated by each image obtained by designating said mask region for each of said plurality of input images.

23. An object detecting apparatus according to claim 22, further comprising the step of:
  updating said masking image registered in said recording apparatus at predetermined time intervals.

24. An object detecting apparatus according to claim 18, wherein said masking region designating unit includes a function of designating said masking region with an operation marker displayed on said display apparatus.

25. An object detecting apparatus according to claim 20, wherein said plurality of input images are input images inputted from said image-pickup apparatus at predetermined time intervals.

26. An object detecting apparatus according to claim 25, wherein said level change detecting unit further has a function of accumulating respective level changes for a predetermined time period, said masking image being updated based on an image of the accumulated level changes.

27. An object detecting apparatus according to claim 20, further comprising a plurality of accumulating means for accumulating images of level changes detected for each of said plurality of said input images, wherein said images of level changes accumulated in said plurality of accumulating means are updated in order of accumulation.

28. An object detecting apparatus according to claim 18, wherein said processing unit further has a function of dividing said input image into a plurality of regions and said masking region designating unit has a function of designating a predetermined region within said plurality of divided regions.

29. An object detecting apparatus according to claim 28, wherein said masking region designating unit further including a function of, when a masking region for which said predetermined change has not been detected over a plurality of said input images is present among said regions designated as said masking regions, releasing said masking region from said masking regions.

30. An object detecting apparatus according to claim 28, wherein said plurality of regions displayed on said display apparatus are displayed either in a rectangular shape or in a shape based on a shape of an object displayed on said input image.

31. An object detecting apparatus according to claim 28, wherein said processing unit has a function of, when a masking region for which said predetermined level change has not been detected for a predetermined time period, is present among said regions designated as said masking regions, releasing said masking region from said masking regions.

32. An object detecting apparatus according to claim 19, wherein said display apparatus has a function of displaying both said input image from said image-pickup apparatus and said mask region candidate on said display apparatus at the same time.

33. An object detecting apparatus according to claim 26, wherein said level change detecting unit has a function of dividing said accumulation time period into a plurality of time periods and forming a divided accumulated image for each divided time period and selecting from said plurality of accumulated images a predetermined divided image as a masking image.

34. An object detecting apparatus according to claim 19, wherein said masking region designating unit includes a function of dilating pixels constituting an object displayed within said mask region candidate at a predetermined rate and a function of shrinking pixels constituting said object dilated at said predetermined rate at a predetermined rate.

35. An object detecting apparatus according to claim 34, wherein said function of dilating pixels constituting an object at a predetermined rate includes either one of 4-neighbor dilating processing, 8-neighbor dilating processing and a combination of 4-neighbor dilating processing and 8-neighbor dilating processing and said function of shrinking said dilated pixels constituting said object dilated at a predetermined rate includes either one of 4-neighbor shrinking processing, 8-neighbor shrinking processing and a combination of 4-neighbor shrinking processing and 8-neighbor shrinking processing.

* * * * *